United States Patent
Sweeney et al.

(10) Patent No.: US 11,821,653 B2
(45) Date of Patent: Nov. 21, 2023

(54) AIR CONDITIONER INCLUDING A PLURALITY OF EVAPORATIVE COOLING UNITS

(71) Applicant: Tyco Fire & Security GmbH, Neuhausen am Rheinfall (CH)

(72) Inventors: Michael J Sweeney, Seattle, WA (US); Nicholas Labonte, Edmonton (CA); Andrew Kim Liang Chan, Edmonton (CA)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/071,336

(22) Filed: Nov. 29, 2022

(65) Prior Publication Data
US 2023/0167989 A1    Jun. 1, 2023

Related U.S. Application Data

(60) Provisional application No. 63/284,456, filed on Nov. 30, 2021.

(51) Int. Cl.
*F24F 5/00*         (2006.01)
*F25B 41/20*        (2021.01)
(Continued)

(52) U.S. Cl.
CPC ............ *F24F 5/0035* (2013.01); *F24F 11/30* (2018.01); *F25B 39/022* (2013.01); *F25B 41/20* (2021.01)

(58) Field of Classification Search
CPC ....... F24F 5/0035; F24F 11/30; F25B 39/022; F25B 41/20
See application file for complete search history.

(56) References Cited

U.S. PATENT DOCUMENTS 3,791,102 A * 2/1974 Huntington ............ B01D 47/00
                                                                  261/36.1
4,940,475 A    7/1990 Yaeger
(Continued)

FOREIGN PATENT DOCUMENTS

CN       210861522 U  *  6/2020
DE      102008006793 A1    8/2009
(Continued)

OTHER PUBLICATIONS

International Search Report and Written Opinion for PCT Application No. PCT/IB2022/051179, dated Jul. 4, 2022, 18 pages.
(Continued)

*Primary Examiner* — Kun Kai Ma
(74) *Attorney, Agent, or Firm* — Fletcher Yoder, PC

(57) ABSTRACT

An air conditioning system includes evaporative cooling units, each evaporative cooling unit including a first V-shaped portion of a winding of microporous hollow fibers that are configured to receive a liquid, and a second V-shaped portion of the winding of microporous hollow fibers that are configured to receive the liquid, where the second V-shaped portion is coupled to the first V-shaped portion, and an internal cavity is disposed between the first V-shaped portion and the second V-shaped portion. The air conditioning system also includes a plumbing assembly configured to supply the liquid to the plurality of evaporative cooling units. The air conditioning system also includes a controller configured to control the plumbing assembly to change a flow rate of the liquid, or to block the liquid from at least one evaporative cooling unit of the plurality of evaporative cooling units.

20 Claims, 20 Drawing Sheets

(51) Int. Cl.
*F25B 39/02* (2006.01)
*F24F 11/30* (2018.01)

(56) References Cited

U.S. PATENT DOCUMENTS

| | | |
|---|---|---|
| 5,202,023 A | 4/1993 | Trimmer et al. |
| 5,217,788 A | 6/1993 | Rye |
| 5,309,726 A * | 5/1994 | Asbridge .............. F24F 5/0035 62/309 |
| 5,946,931 A | 9/1999 | Lomax et al. |
| 9,541,302 B2 | 1/2017 | Taylor et al. |
| 2008/0018001 A1 | 1/2008 | Kammerzell et al. |
| 2012/0304862 A1 | 12/2012 | Taylor et al. |
| 2013/0213076 A1 | 8/2013 | Gerlach |
| 2013/0269924 A1 | 10/2013 | Bugler et al. |
| 2013/0320573 A1 | 12/2013 | Fisher et al. |
| 2015/0069643 A1 * | 3/2015 | Mockry ................... F28C 1/00 261/146 |
| 2017/0321913 A1 | 11/2017 | Dinnage et al. |
| 2018/0372387 A1 | 12/2018 | Echols |
| 2020/0208887 A1 | 7/2020 | Mohammad et al. |
| 2020/0284480 A1 | 9/2020 | Tolouei Asbforoushani et al. |

FOREIGN PATENT DOCUMENTS

| | | |
|---|---|---|
| DE | 102015005099 A1 | 3/2016 |
| JP | H10110974 A * | 4/1998 |
| JP | 2015129373 A | 7/2015 |
| KR | 20200016444 A | 2/2020 |
| WO | 2004028671 A1 | 4/2004 |
| WO | 2021072448 A1 | 4/2021 |

OTHER PUBLICATIONS

International Search Report and Written Opinion for PCT Application No. PCT/US2022/051395, dated Mar. 13, 2023, 13 pages.
International Search Report and Written Opinion for PCT Application No. PCT/US2022/051406, dated May 17, 2023, 18 pages.

* cited by examiner

AIR CONDITIONER INCLUDING A PLURALITY OF EVAPORATIVE COOLING UNITS

CROSS-REFERENCE TO RELATED APPLICATIONS

This application claims priority from and the benefit of U.S. Provisional Application Ser. No. 63/284,456, entitled "AIR CONDITIONER INCLUDING A PLURALITY OF EVAPORATIVE COOLING UNITS," filed Nov. 30, 2021, which is hereby incorporated by reference in its entirety for all purposes.

BACKGROUND OF THE DISCLOSURE

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

HVAC equipment and independent cooling devices, such as air handling units, localized air coolers, fan walls, and building systems, face many design constraints during their development. The air supplied through such equipment needs to match stringent design specifications, the footprint must be minimized to save space on-site, and the overall energy consumption should be optimized. As a result, designers must carefully select any components internal to the equipment so as to meet these and other constraints.

Accordingly, there has been an increased utilization of evaporative cooling technology in recent years due to its lower energy consumption compared to other cooling methods. Evaporative coolers lower the temperature of an airstream through the introduction and subsequent evaporation of water particles. These components prove especially useful when the inlet air conditions are dry and warm. Traditional evaporative coolers generally consist of evaporative media, an assembly to hold the media in place, a supply water reservoir, and a water distribution system. Water is piped from the reservoir to the top of the evaporative media; as water gravity drains downward, some water is absorbed into the evaporative media, and the rest falls back into the supply water reservoir. When air passes through this wetted media, water evaporates into the airstream, and it is this process which adiabatically cools the air.

Traditional evaporative coolers have several drawbacks. For example, traditional evaporative coolers are susceptible to water carryover. Water carryover is a process in which air passing through the evaporative media pulls excess water droplets out into the air, resulting in the unintentional accumulation of water in the downstream area. At high air velocities, this process becomes more pronounced. Further, the evaporative media of traditional evaporative coolers may be oriented generally perpendicular to an air flow passing over the evaporative media, such that pressure and velocity profiles across the media are substantially uniform. While this orientation may reduce water carryover, it increases a size of the traditional evaporative cooler. The relatively large size of traditional evaporative coolers may be compounded by the inclusion of a containment device below the evaporative media that collects water as it is gravity-fed downwardly, and by the use of a mist eliminator downstream of the evaporative media and configured to absorb water carried through the air. The mist eliminator also generates a pressure drop that causes an increase in power requirements and corresponding decrease in overall efficiency of the traditional evaporative cooler.

Further, traditional evaporative coolers may require the use of relatively clean water to reduce mineral deposits, commonly known as "scale" build-up. The susceptibility of traditional evaporative coolers to mineral deposits may require time consuming maintenance techniques and/or excessive water replacement. Further, traditional evaporative coolers are limited in their ability to precisely control the supply air temperature and humidity. In general, the exiting air can be controlled by turning the traditional evaporative cooler ON or OFF depending on the temperature or humidity requirements. That is, delivery of water to the evaporative media may be enabled when the traditional evaporative cooler is ON and disabled when the evaporative cooler is OFF. However, the evaporative media may remain wet for a time period after the traditional evaporative cooler is switched to OFF, causing additional cooling and humidification to occur, which contributes to control latency of the traditional evaporative cooler. Once the media is wet, the amount of water that evaporates into the airstream is completely dependent on the incoming air conditions.

Further still to the points above, a shape of traditional evaporative cooling units, which may be constrained based on the above-described limitations (e.g., water carryover, cooler unit orientation, scale build-up, etc.), may increase a footprint and reduce an efficiency of the corresponding system. For the foregoing reasons, among others, it is now recognized that improved evaporative cooling systems and methods are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an air conditioning system includes evaporative cooling units, wherein each evaporative cooling unit includes a first V-shaped portion of a winding of microporous hollow fibers configured to receive a liquid, a second V-shaped portion of the winding of microporous hollow fibers configured to receive the liquid, and an internal cavity disposed between the first V-shaped portion and the second V-shaped portion. The first V-shaped portion and the second V-shaped portion are coupled together. The air conditioning system also includes a plumbing assembly configured to supply the liquid to the evaporative cooling units. The air conditioning system also includes a controller configured to control the plumbing assembly to change a flow rate of the liquid, or to block the liquid from at least one evaporative cooling unit of the evaporative cooling units.

In another embodiment, an air conditioning system includes evaporative cooling units, a plumbing assembly, and a controller. Each evaporative cooling unit includes a sheet forming a closed-loop shape comprising a rhombus or rhomboid. The sheet includes microporous hollow fibers contained therein, where each microporous fiber includes one or more walls, a liquid flow path defined by the one or more walls and configured to receive a liquid, and pores extending through the one or more walls. The pores are configured to block passage of the liquid therethrough and enable passage of a vapor formed from the liquid therethrough. Further, the plumbing assembly is configured to supply the liquid to the evaporative cooling units. Further still, the controller is configured to control the plumbing assembly to change a flow rate of the liquid, or block the liquid from at least one evaporative cooling unit of the evaporative cooling units.

In another embodiment, an air conditioning system includes evaporative cooling units, each evaporative cooling unit including a winding of microporous hollow fibers forming a closed-loop shape having a leading edge, a trailing edge configured to be disposed downstream of the leading edge relative to an air flow, and an internal cavity disposed between the leading edge and the trailing edge.

BRIEF DESCRIPTION OF THE DRAWINGS

Various aspects of this disclosure may be better understood upon reading the following detailed description and upon reference to the drawings in which.

DETAILED DESCRIPTION

Figure 1:
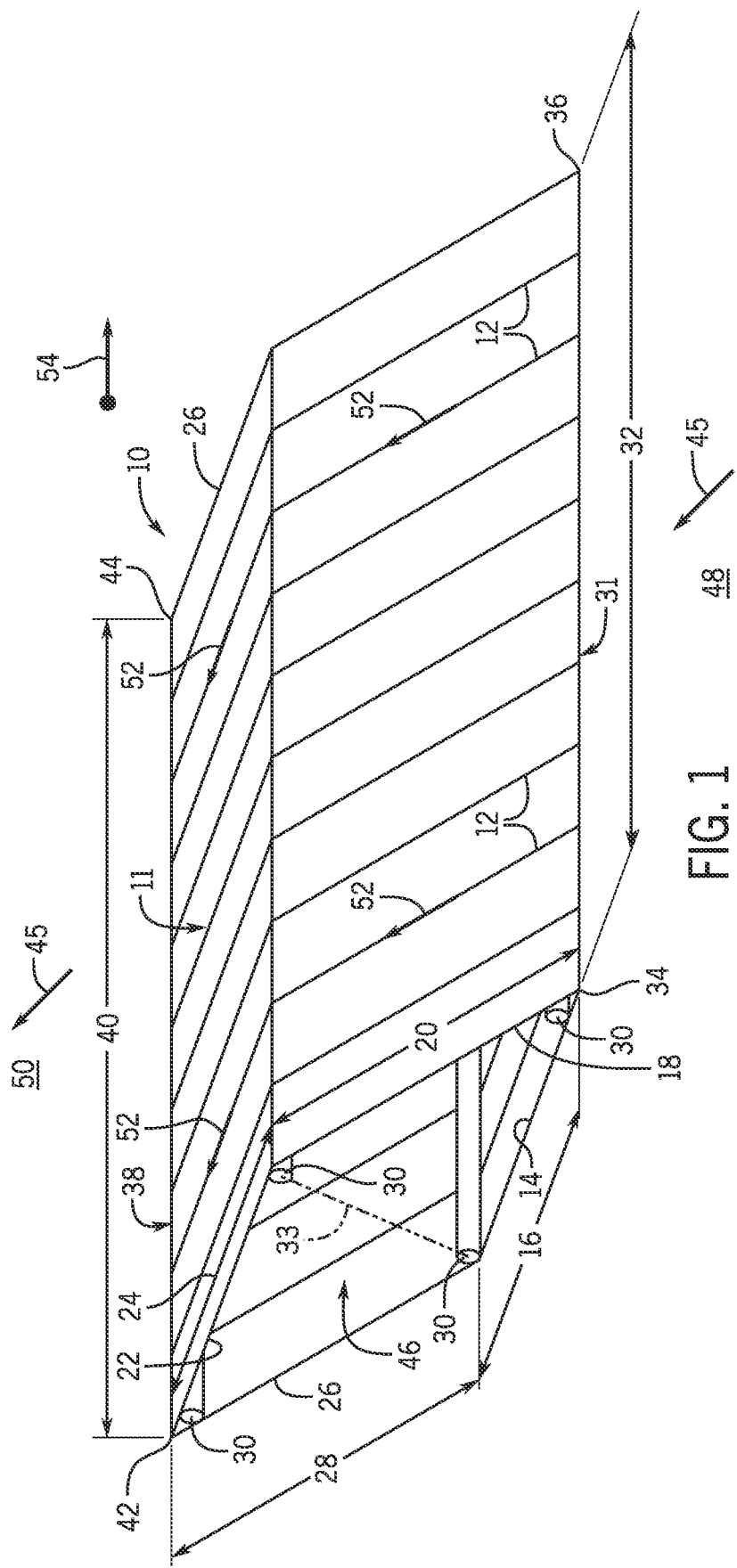
FIG. 1 is a schematic perspective view of an evaporative cooling unit including microporous hollow fibers wound in a generally closed-loop shape (e.g., a rhombus), in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to evaporative cooling units for use in HVAC equipment or as an independent cooling and/or humidifying apparatus. In particular, this disclosure relates to an air conditioner having a plurality of evaporative cooling units, each evaporative cooling unit including microporous hollow fibers wound in a generally closed-loop shape (e.g., a rhombus shape) having a leading edge, a trailing edge, and an internal cavity between the leading edge and the trailing edge.

The utilization of evaporative cooling technology has increased in recent years due to its lower energy consumption compared to other cooling methods. Evaporative coolers lower the temperature of an airstream through the introduction and subsequent evaporation of water particles. These components prove especially useful when the inlet air conditions are dry and warm.

Membrane-contactor panels composed of a plurality of microporous hollow fibers are known in the art (for example, 3M® media utilizing CELGARD® microporous hollow fibers). Water or some other liquid is guided through the plurality of microporous hollow fibers, and an ambient gas stream (e.g., air) is passed over the plurality of microporous hollow fibers. Walls of the microporous hollow fibers are permeable only to water in the vapor form; liquid water cannot exit the walls of the microporous hollow fibers to directly mix with the ambient gas stream. As water vapor exits the walls of the microporous hollow fibers via pores in the walls, it comes into direct contact with the ambient gas stream resulting in a transfer of mass and energy. This contrasts with traditional evaporative media whereby the liquid water wetting the media's surface evaporates directly into the ambient gas stream.

In accordance with the present disclosure, an air conditioner includes a plurality of evaporative cooling units, where each evaporative cooling unit includes microporous hollow fibers wound in a closed-loop shape having a leading edge, a trailing edge, and an internal cavity between the leading edge and the trailing edge. For example, the microporous hollow fibers may be embedded or otherwise contained in a sheet (e.g., a flexible sheet, such as a woven fabric sheet) that is wound about various anchors (e.g., rods, frame members, poles) of the evaporative cooling unit to form the closed-loop shape. In some embodiments, the sheet having the microporous hollow fibers is wound about the various anchors several times, such that the closed-loop shape includes multiple layers of the microporous hollow fiber. In accordance with the present disclosure, the closed-loop shape may be a rhombus or a rhomboid. A rhombus is a quadrilateral whose four sides have equal lengths. A rhomboid is a parallelogram having adjacent sides of dissimilar lengths and non-right angles between adjacent sides. However, it should be understood that the closed-loop shape may not form a perfect geometric rhombus or rhomboid. Indeed, one of ordinary skill in the art would recognize that the closed-loop shape may deviate from a perfect geometric rhombus or rhomboid (e.g., due to engineering tolerances), but that the closed-loop shape would still be considered a rhombus or rhomboid by one of ordinary skill in the art.

Further, it should be understood that "the closed-loop shape," in accordance with the present disclosure, may be partially completed by a component of the evaporative cooling unit other than the sheet of microporous hollow fibers. For example, the sheet of microporous hollow fibers may be attached to a first anchor of the above-described anchors of the evaporative cooling unit, and wound about additional anchors (e.g., second, third, and fourth anchors) of the evaporative cooling and back to the first anchor. The first anchor may form a portion of the closed-loop shape. Stated differently, the anchors of the evaporative cooling unit may define the closed-loop shape about which the sheet of microporous hollow fibers is wound, such that the sheet of microporous hollow fibers forms the closed-loop shape after being wound about the anchors. As previously described, in some embodiments, the sheet of microporous hollow fibers may be wound about the anchors of the evaporative cooling unit multiple times, creating layers of the microporous hollow fibers about the closed-loop shape. These and other features will be described in detail with reference to the drawings.

In operation of the evaporative cooling unit, a liquid (e.g., liquid water) is routed through the above-described microporous hollow fibers. An air flow is directed from an upstream area external to the closed-loop shape, through the leading edge defined by the closed-loop shape, into the internal cavity between the leading edge and the trailing edge of the closed-loop shape, through the trailing edge defined by the closed-loop shape, and into a downstream area external to the closed-loop shape. As the air flow passes through the leading edge and the trailing edge, the air flow may pass between various adjacent microporous hollow fibers. Further, as the air flow passes through the leading edge, into the internal cavity, and through the trailing edge, water vapor may exit pores in the walls of the microporous hollow fibers and into the air flow, resulting in a transfer of mass and energy. Thus, the air flow is cooled and humidified by the evaporative cooling unit for delivery to a conditioned space.

An air conditioner in accordance with the present disclosure includes a plurality of the above-described evaporative cooling units. Various arrangements of the plurality of evaporative cooling units are described in detail below, including an alignment of the plurality of evaporative cooling units in a X-direction, Y-direction, and/or Z-direction, and including an orientation of the plurality of evaporative cooling units relative to an airflow. Additionally or alternatively, the air conditioner may include various system-level features that integrate the plurality of evaporative cooling units in the air conditioner. For example, various embodiments in accordance with the present disclosure may include the plurality of evaporative cooling units fluidly coupled (e.g., with respect to a flow of liquid therethrough) in parallel, in series, or a combination thereof. Additionally or alternatively, the air conditioner may include various features and controls that enable an air flow bypass of one or more of the evaporative cooling units, that enable selective operation of certain of the evaporative cooling units (e.g., by enabling or blocking the flow of liquid therethrough), or a combination thereof. These and other features relating to an integration of a plurality of evaporative cooling units in an air conditioner system are described in detail below with reference to the drawings.

The above-described configuration of the air conditioner employing a plurality of evaporative cooling units may provide several technical benefits over traditional embodiments. For example, the closed-loop (e.g., rhombus) shape formed by the winding of microporous hollow fibers in each evaporative cooling unit may provide a higher density of evaporative cooling media than traditional embodiments. Indeed, in certain traditional embodiments, evaporative cooling media may be oriented such that a face of the evaporative cooling media is oriented perpendicular to the direction of air flow thereover, as orienting the traditional evaporative cooling media at an oblique angle relative to the direction of air flow may cause undesirable water carryover into the air flow. The microporous hollow fibers of the disclosed evaporative cooling units are not susceptible to water carryover and, thus, can be oriented at oblique angles relative to the direction of air flow without water carryover. The presently disclosed closed-loop (e.g., rhombus) shape of the winding of microporous hollow fibers of each evaporative cooling unit may generally leverage the above-described technical effects to increase a density of evaporative cooling media and increase an amount of cooling, increase an efficiency of the system, and reduce a footprint of the system. Further, at least in part due to the above-described advantages, an air conditioner employing multiple ones of the evaporative cooling units may be more versatile, modifiable, and/or customizable in meeting design constraints (e.g., footprint constraints, a need for air flow bypass features, etc.) associated with particular environments or settings of the air conditioner. These and other features are outlined in detail below.

FIG. 1 is a schematic perspective view of an embodiment of an evaporative cooling unit 10 including a winding 11 (or sheet) of microporous hollow fibers 12 forming a closed-loop shape, such as a rhombus. The winding 11 of microporous hollow fibers 12 may include a flexible sheet of microporous hollow fibers 12 that is wound about various anchors 30 (e.g., rods, frame members, poles) of the evaporative cooling unit 10 to form the closed-loop shape. A frame (not shown) may connect the anchors 30 such that the anchors 30 are held in place.

In the illustrated embodiment, the closed-loop shape includes a first side 14 of the winding 11 of microporous hollow fibers 12 (e.g., having a first length 16), a second side 18 of the winding 11 of microporous hollow fibers 12 (e.g., having a second length 20), a third side 22 of the winding 11 of microporous hollow fibers 12 (e.g., having a third length 24), and a fourth side 26 of the winding 11 of microporous hollow fibers 12 (e.g., having a fourth length 28). The first length 16, the second length 20, the third length 24, and the fourth length 28 are substantially equal (e.g., within engineering tolerances). Accordingly, the closed-loop shape formed by the winding 11 of microporous hollow fibers 12 in FIG. 1 is a rhombus. However, another embodiment of the evaporative cooling unit 10 may include the winding 11 of microporous hollow fibers 12 forming a different closed-loop shape, such as a rhomboid. Further, in the illustrated embodiment, the first side 14 and the second side 18 may form a first V-shaped portion of the winding 11, the third side 22 and the fourth side 26 may form a second V-shaped portion of the winding 11, and the first V-shaped portion may be coupled to the second V-shaped portion to form the closed-loop shape (e.g., rhombus, rhomboid). Each microporous hollow fiber 12 in the illustrated embodiment includes a fluid flow path that extends across the first side 14, the second side 18, the third side 22, and the fourth side 26 of the closed-loop shape. Further, the winding 11 of microporous hollow fibers 12 may be wound about the anchors 30 multiple times such that multiple layers of the microporous hollow fibers 12 exist on each side 14, 18, 22, 26 of the closed-loop shape.

In FIG. 1, a leading edge 31 of the evaporative cooling unit 10 is defined by the first side 14 and the second side 18 of the closed-loop shape. The leading edge 31 includes a width 32 extending perpendicular to the first length 16 of the first side 14 and the second length 20 of the second side 18. The width 32 of the leading edge 31 is defined between an end juncture 34 of the first side 14 and the second side 18 and an additional end juncture 36 of the first side 14 and the second side 18. Further, a trailing edge 38 of the evaporative cooling unit 10 is defined by the third side 22 and the fourth side 26 of the closed-loop shape. The trailing edge 38 includes a width 40 extending perpendicular to the third length 24 of the third side 22 and the fourth length 28 of the fourth side 26. The width 40 of the trailing edge 38 is defined by an end juncture 42 of the third side 22 and the fourth side 26 and an additional end juncture 44 of the third side 22 and the fourth side 26. The width 40 of the trailing edge 38 and the width 32 of the leading edge 31 may be substantially equal (e.g., within engineering tolerances).

It should be noted that the leading edge 31 may include an entirety of the first side 14 and the second side 18 of the closed-loop shape, and that the trailing edge 38 may include an entirety of the third side 22 and the fourth side 26 of the closed-loop shape. In the illustrated embodiment, the leading edge 31 forms a first arrow shape (or V-shape), the trailing edge 38 forms a second arrow shape, (or V-shape) and the first arrow shape and the second arrow shape may together form the closed-loop shape. The first arrow shape of the leading edge 31 and the second arrow shape of the trailing edge 38 may be symmetrical across an axis 33 therebetween.

The leading edge 31 is referred to as "leading" and the trailing edge 38 is referred to as "trailing" with respect to an air flow 45 directed toward and through the evaporative cooling unit 10. For example, the evaporative cooling unit 10 includes an internal cavity 46 bound by the closed-loop shape of the winding 11 of microporous hollow fibers 12. That is, the internal cavity 46 is defined by the first side 14, the second side 18, the third side 22, and the fourth side 26 of the closed-loop shape. In other words, the internal cavity 46 is disposed between the leading edge 31 and the trailing edge 38. In general, the internal cavity 46 is devoid of the microporous hollow fibers 12. The air flow 45 is directed from an upstream space 48, toward the leading edge 31, through the leading edge 31 (e.g., through the first side 14 and the second side 18 of the closed-loop shape), into the internal cavity 46, through the trailing edge 38 (e.g., through the third side 22 and the fourth side 26 of the closed-loop shape), into a downstream space 50, and away from the trailing edge 38. The air flow 45 is generally passed over the microporous hollow fibers 12, such as through spaces between the microporous hollow fibers 12. In some embodiments, the winding 11 of the microporous hollow fibers 12 includes a sheet (e.g., a flexible sheet, such as one formed by a woven fabric material) that permits the air flow 45 to pass through the winding 11 (e.g., through spaces between the microporous hollow fibers 12).

Figure 2:
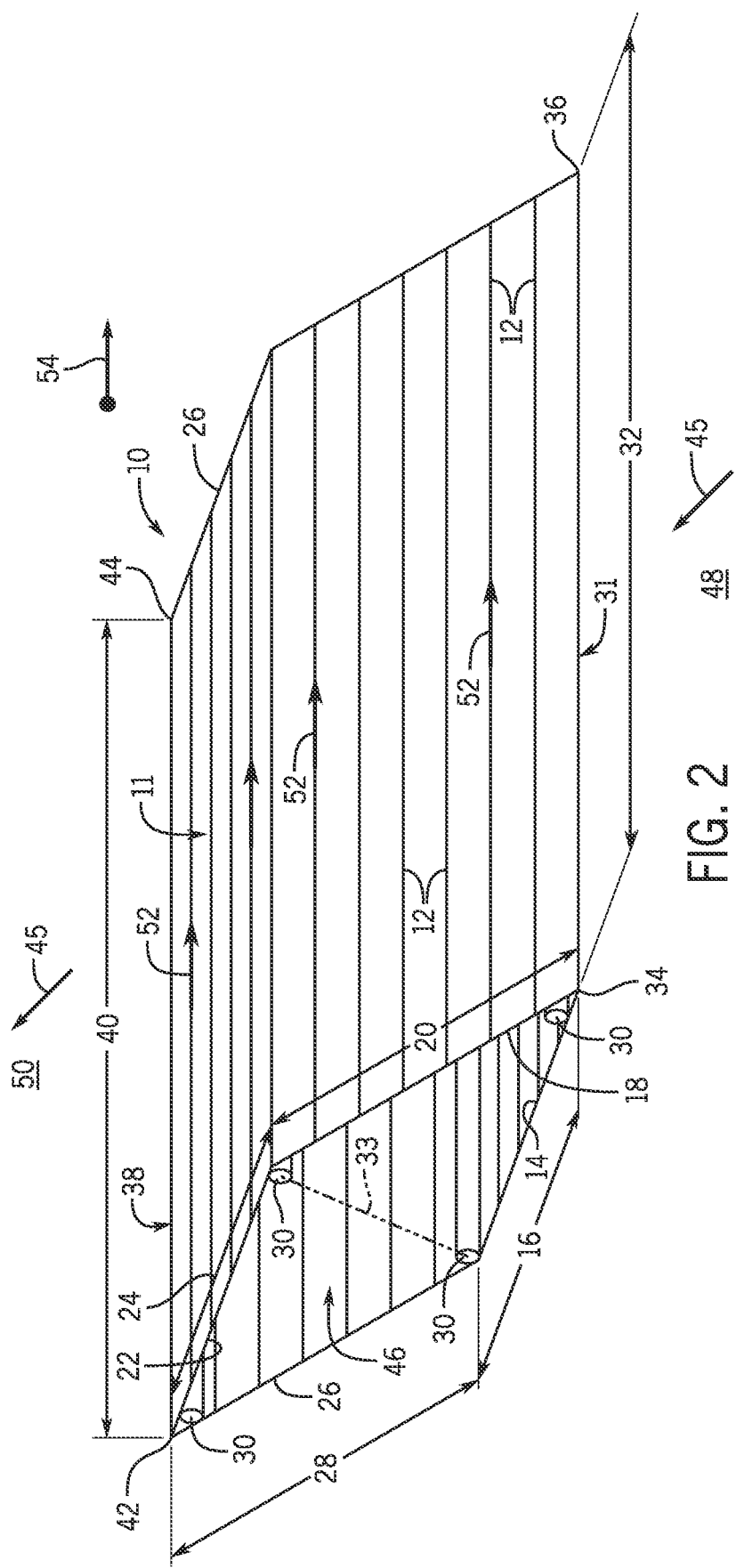
FIG. 2 is a schematic perspective view of another evaporative cooling unit including microporous hollow fibers wound in a generally closed-loop shape (e.g., a rhombus), in accordance with an aspect of the present disclosure.

A liquid 52 (e.g., liquid water) is passed through the microporous hollow fibers 12. For example, in the illustrated embodiment, the microporous hollow fibers 12 are oriented such that the liquid 52 is passed through the microporous hollow fibers 12 along the first length 16 of the first side 14, the second length 20 of the second side 18, the third length 24 of the third side 22, and the fourth length 28 of the fourth side 26. However, in another embodiment of the evaporative cooling unit 10 illustrated in FIG. 2, the microporous hollow fibers 12 are oriented such that the liquid 52 is passed through the microporous hollow fibers 12 in a direction 54 perpendicular to the first length 16 of the first side 14, the second length 20 of the second side 18, the third length 24 of the third side 22, and the fourth length 28 of the fourth side 26. That is, the direction 54 in which the liquid 52 is routed through the microporous hollow fibers 12 in FIG. 2 is substantially parallel with the width 32 of the leading edge 31 of the evaporative cooling unit 10 and the width 40 of the trailing edge 38 of the evaporative cooling unit 10. In both of FIGS. 1 and 2, one of the anchors 30 (e.g., rods, frame members, poles) of the evaporative cooling unit 10 may act as an inlet to the microporous hollow fibers 12, and one of the anchors 30 (e.g., rods, frame members, poles) of the evaporative cooling unit 10 may act as an outlet of the microporous hollow fibers 12. In another embodiment, the evaporative cooling unit 10 may include an inlet and an outlet separate from the anchors 30.

As the liquid 52 is routed through the microporous hollow fibers 12 and the air flow 45 is passed through the evaporative cooling unit 10 (e.g., from the upstream space 48, through the first side 14 and the second side 18, into the internal cavity 46, through the third side 22 and the fourth side 26, and to the downstream space 50), the liquid 52 may be heated (or a portion thereof otherwise vaporized) and the air flow 45 may be cooled. Further, as previously described, the microporous hollow fibers 12 are configured to enable vapor formed from the liquid 52 to pass through pores in the walls of the microporous hollow fibers 12, such that the vapor comes into direct contact with the air flow 45, resulting in humidification of the air flow 45 and a transfer of mass and energy.

The above-described configurations of the evaporative cooling unit 10 in FIGS. 1 and 2 enable the air flow 45 to pass over the microporous hollow fibers 12 multiple times. For example, the closed-loop shape (e.g., rhombus shape) is configured to enable the air flow 45 to pass over multiple layers of the microporous hollow fibers 12 (e.g., at each side 14, 18, 22, 26 of the closed-loop shape), and through both the leading edge 31 and the trailing edge 38, thereby improving conditioning (e.g., cooling, humidifying) of the air flow 45 relative to traditional configurations. Further, the closed-loop shape (e.g., rhombus shape) may reduce a footprint or size of the evaporative cooling unit 10 relative to traditional configurations.

Figure 3:
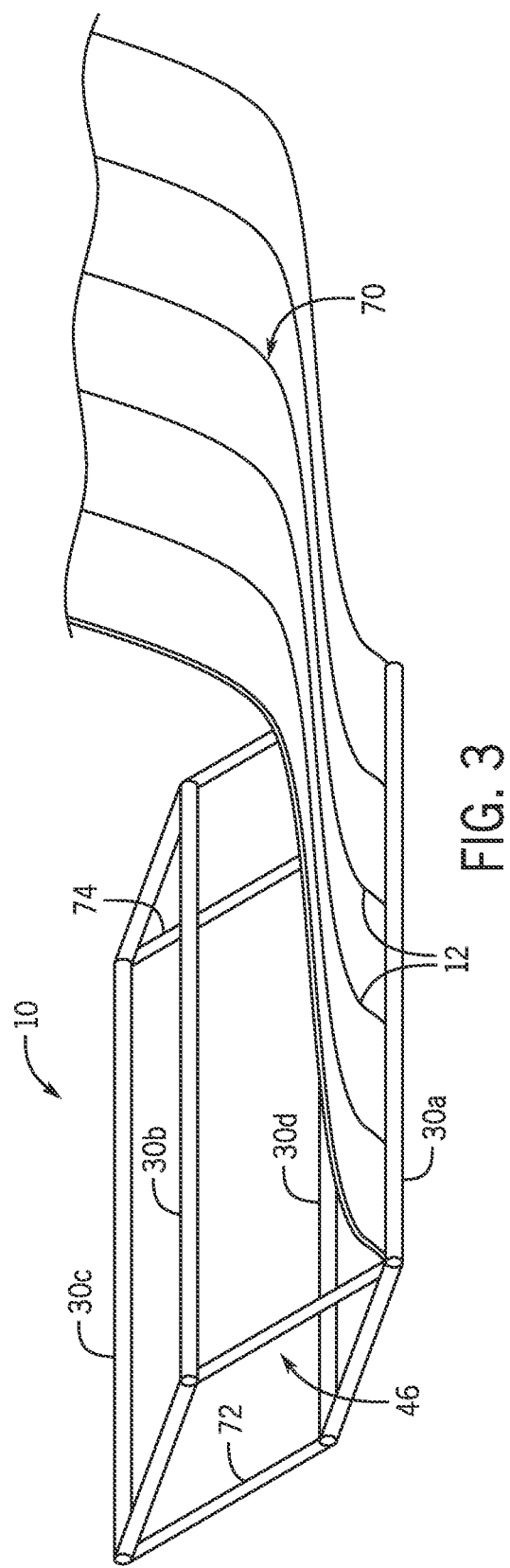
FIG. 3 is a schematic perspective view of a partially unassembled evaporative cooling unit, in accordance with an aspect of the present disclosure.

FIG. 3 is a schematic perspective view of an embodiment of a partially unassembled evaporative cooling unit 10. In the illustrated embodiment, the evaporative cooling unit includes a sheet 70 of the microporous hollow fibers 12. For example, as previously described, the sheet 70 may include a flexible material (e.g., a woven fabric) in which the microporous hollow fibers 12 are embedded, woven, or otherwise contained. The evaporative cooling unit 10 also includes four anchors 30 about which the sheet 70, when fully assembled, is wound (e.g., to form the winding 11 illustrated in FIGS. 1 and 2).

As shown, the sheet 70 may be attached a first anchor 30a. The sheet 70 may then be wound about the three other anchors 30b, 30c, 30d. In the illustrated embodiment, the anchors 30 are held in place by a first frame member 72 and a second frame member 74. However, the anchors 30 may be held in place relative to one another via different types of frames, frames located at different positions than the first frame member 72 and the second frame member 74 illustrated in FIG. 3, or both. As previously described, in some embodiments, the sheet 70 having the microporous hollow fibers 12 may be wound about the anchors 30 multiple times. For example, the sheet 70 may be attached to the first anchor 30a, wound about the second anchor 30b, the third anchor 30c, and the fourth anchor 30d, and then wound about the first anchor 30a, the second anchor, the third anchor 30c, and the fourth anchor 30d again. In some embodiments, the sheet 70 may be wound about the anchors 30 five times, ten times, fifteen times, or twenty or more times, depending on the preferred footprint and cooling capacity of the evaporative cooling unit 10. After the sheet 70 having the microporous hollow fibers 12 is wound about the anchors 30 (e.g., one or more times), the internal cavity 46 of the evaporative cooling unit 10 is formed inwards from the sheet 70.

Figure 4:
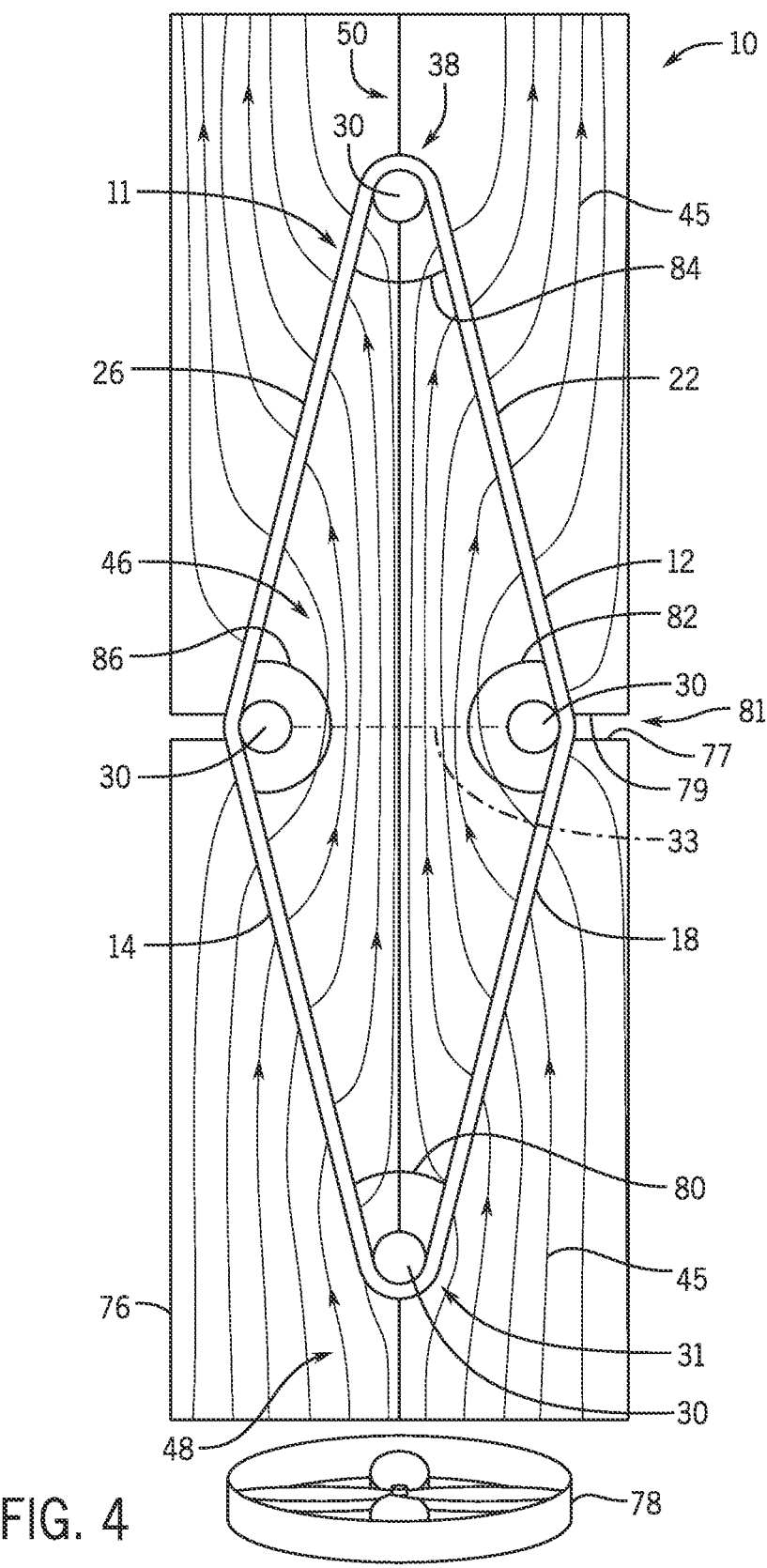
FIG. 4 is a schematic cross-sectional view of an evaporative cooling unit including microporous hollow fibers wound in a generally closed-loop shape (e.g., a rhombus), in accordance with an aspect of the present disclosure.

FIG. 4 is a schematic cross-sectional view of an embodiment of an evaporative cooling unit 10 including the winding 11 of microporous hollow fibers 12 forming a closed-loop shape (e.g., a rhombus). In FIG. 4, the evaporative cooling unit 10 is illustrated in operation. For example, the airflow 45 is directed from the upstream space 48, through the leading edge 31, into the internal cavity 46, through the trailing edge 38, and into the downstream space 50. The upstream space 48, the closed-loop shape (e.g., having the leading edge 31 and the trailing edge 38), and the downstream space 50 is contained within a flow channel 76 (e.g., a box, a conduit, etc.) of the evaporative cooling unit 10, where the flow channel 76 is configured to guide the air flow 45 from the downstream space 48, through the leading edge 31, into the internal cavity 46, though the trailing edge 38, and into the downstream space 50. The air flow 45 may be generated via a fan 78 (e.g., upstream of the flow channel 76 or within the flow channel 76). The flow channel 76 may include a first wall 77 facing the upstream space 48 and a second wall 79 facing the downstream space 50, where the first wall 77 and the second wall 79 operate to block the air flow 45 from bypassing the closed-loop space formed by the microporous hollow fibers 12. That is, the first wall 77 and the second wall 79 may extend to a juncture between the leading edge 31 and the trailing edge 38 of the closed-loop shape. A gap 81 outside of the flow channel 76 may extend between the first wall 77 and the second wall 79, where the gap 81 is fluidly isolated from the air flow 45.

As shown in FIG. 4, the air flow 45 may be substantially perpendicular to the first side 14 of the closed-loop shape as the air flow 45 traverses the first side 14. Likewise, the air flow 45 may be substantially perpendicular to the second side 18 of the closed-loop shape as the air flow 45 traverses the second side 18, substantially perpendicular to the third side 22 of the closed-loop shape as the air flow 45 traverses the third side 22, and substantially perpendicular to the fourth side 26 of the closed-loop shape as the air flow 45 traverses the fourth side 26. Liquid (not shown), such as liquid water, is routed through the microporous hollow fibers 12 such that, for example, a heat exchange relationship is generated between the liquid (not shown) and the air flow 45, as previously described. Accordingly, the flow of the liquid through the microporous hollow fibers 12 may be substantially perpendicular to the flow of the air flow 45 over the microporous hollow fibers 12.

In the illustrated embodiment, the first side 14 and the second side 18 of the closed-loop shape form a first angle 80, the second side 18 and the third side 22 of the closed-loop shape form a second angle 82, the third side 22 and the fourth side 26 of the closed-loop shape form a third angle 84, and the fourth side 26 and the first side 14 of the closed-loop shape form a fourth angle 86. The first angle 80 and the third angle 84 are acute, while the second angle 82 and the fourth angle 86 are obtuse. However, in another embodiment, the first angle 80 and the third angle 84 may be obtuse, while the second angle 82 and the fourth angle 86 may be acute. Further, in certain embodiments, the first angle 80, the second angle 82, the third angle 84, and the fourth angle 86 may be right angles. Further still, while the illustrated embodiment includes a rhombus shape, another embodiment may include a rhomboid shape.

Figure 5:
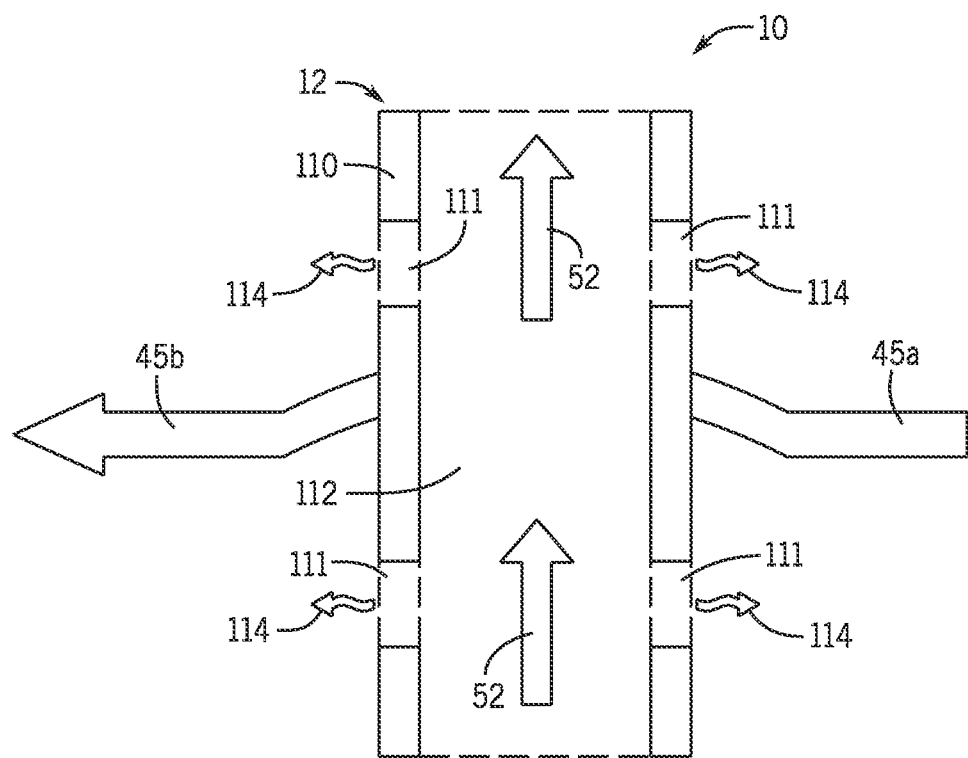
FIG. 5 is a magnified view that depicts the water and air membrane interface of a microporous hollow fiber that resides within an evaporative cooling unit, in accordance with an aspect of the present disclosure.

A magnified cross-section of a single microporous hollow fiber 12 is shown in FIG. 5. A flow of water 52 (in the liquid phase) moves through a microporous hollow fiber cavity 112 (or liquid flow path) and is contained within the volume enclosed by one or more walls 110 of the microporous hollow fiber 12. An unconditioned (or intake) air flow 45a is directed toward the microporous hollow fiber 12. When ambient conditions permit, liquid water vaporizes into the airstream (exterior to the microporous hollow fiber walls 110) by undergoing a phase change. Water vapor 114 exits the microporous hollow fiber cavity 112 (or liquid flow path) through a plurality of pores 111 and comes into direct contact with the ambient air. Water vapor mixes with the ambient air and adiabatically cools and/or humidifies the air stream. This results in a conditioned discharge airflow 45b.

Figure 6:
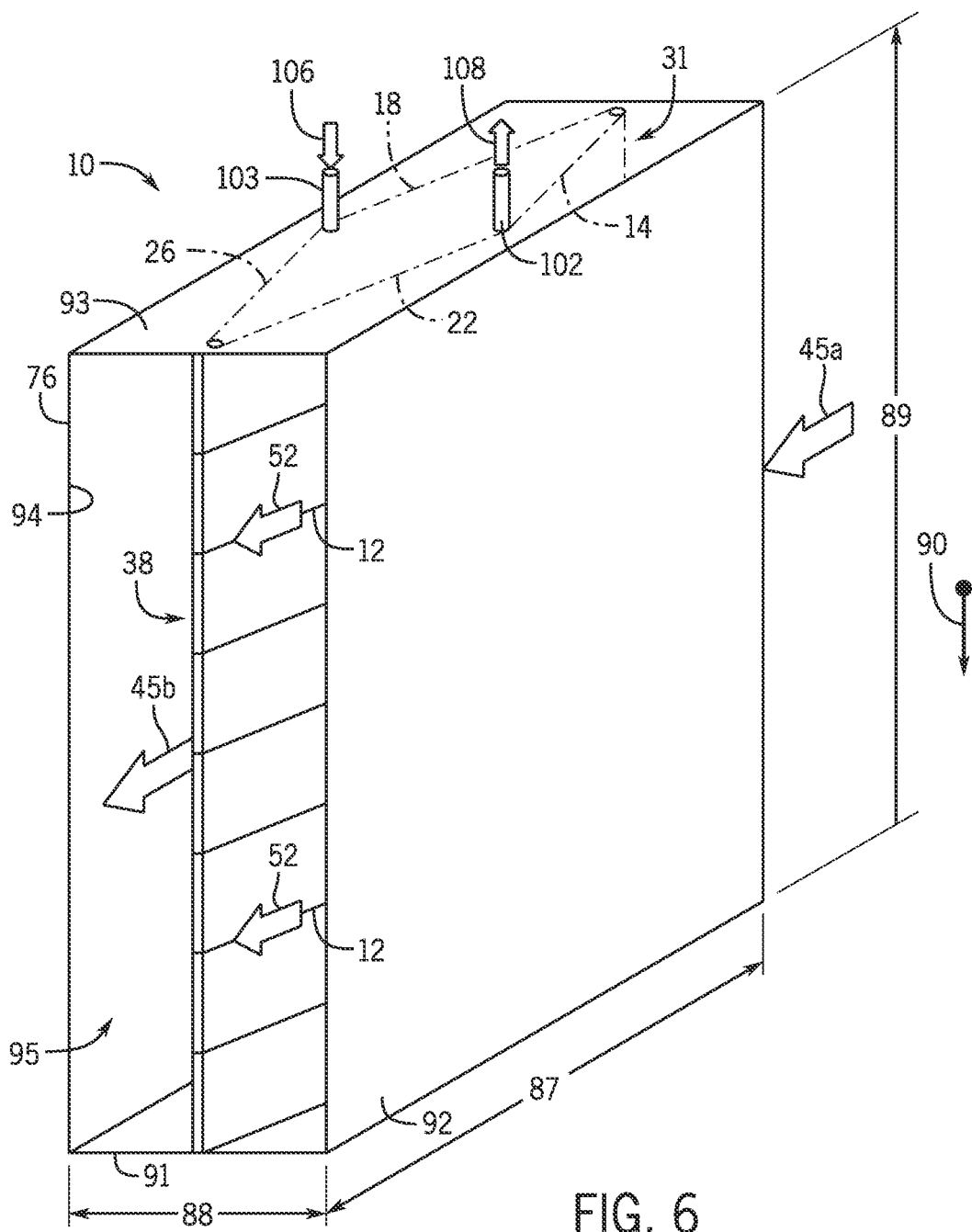
FIG. 6 is an isometric view of an evaporative cooling unit, which includes a frame, a water inlet port, and a water outlet port, in accordance with an aspect of the present disclosure.

FIG. 6 is an isometric view of an evaporative cooling unit 10, which includes a frame 76 (referred to in certain instances of the present disclosure as an air flow channel, a box, or a conduit) having a length 87, a width 88, and a height 89. In the illustrated embodiment, the width 88 is less than the length 87 and the height 89. Further, the length 87 and the height 89 are similarly sized (e.g., the height 89 is between 80% and 120% of the length 87). However, sizing of the frame 76 may vary depending on the embodiment. Further, it should be understood that "width," "length," and "height" do not necessarily denote an orientation of the evaporative cooling unit 10 (e.g., relative to a gravity vector 90). For example, in the illustrated embodiment, the height 89 runs parallel to the gravity vector 90. However, in another embodiment, the width 88 may run parallel to the gravity vector.

The evaporative cooling unit 10 in the illustrated embodiment includes a water outlet port 102, a water inlet port 103, and a plurality of microporous hollow fibers 12 that are supported by fabric weaves or other means. Air flow 45a depicts the unconditioned input air that enters the evaporative cooling unit 10, and air flow 45b depicts the conditioned discharge air that exits the evaporative cooling unit 10. Input or inlet water 106 enters the evaporative cooling unit 10 through the water inlet port 103, is distributed into the cavity of each individual microporous hollow fiber 12 (e.g., denoted by flow of water 52), and collectively discharges through the water outlet port 102. Outlet or output water 108 exits the water outlet port 102. That is, 106 depicts the water flow as it enters the water inlet port 103, 52 depicts the water flow as it travels through the plurality of microporous hollow fibers 12, and 108 depicts the water flow as it exits the water outlet port 102. Although FIG. 1 depicts one possible configuration where the water inlet port 103 and the water outlet port 102 are disposed on a common side of the evaporative cooling unit 10, the water inlet port 103 and water outlet port 102 may be disposed on different sides of the evaporative cooling unit 10 in another embodiment. Further, in certain embodiments, multiple instances of the water inlet port 103 may be included, and/or multiple instances of the water outlet port 102 may be included.

In the illustrated embodiment, the evaporative cooling unit 10 includes the trailing edge 38 through which the discharge (or conditioned) air flow 45b passes. The trailing edge 38 may include the third side 22 and the fourth side 26 of the closed-loop (e.g., rhombus) shape formed by the winding 11 of microporous hollow fibers 12 and fabric weaves (or other means) utilized to support the microporous hollow fibers 12, as previously described. An end of the evaporative cooling unit 10 is open adjacent to the trailing edge 38 to enable the discharge air flow 45b to be exhausted from the frame 101 and, thus, the evaporative cooling unit 10. That is, the illustrated frame 76 includes a first side panel 91 (e.g., lower side panel), a second side panel 92, a third side panel 93 (e.g., upper side panel), and a fourth side panel 94. The panels 91, 92, 93, 94 define an open end 95 of the evaporative cooling unit 10 adjacent to the trailing edge 38. The evaporative cooling unit 10 also includes a leading edge 31 configured to receive the incoming (or unconditioned) air flow 45a. The leading edge 31 may include the first side 14 and the second side 18 of the closed-loop (e.g., rhombus) shape formed by the plurality of microporous hollow fibers 12 and fabric weaves (or other means) utilized to support the microporous hollow fibers 12. The panels 91, 92, 93, 94 of the frame 76 define an open end 96 of the evaporative cooling unit 10 adjacent to the leading edge 31 to enable the incoming air flow 45a to pass into the frame 76 of the evaporative cooling unit 10. It should be noted that the illustrated evaporative cooling unit 10 is merely an example in accordance with the present disclosure, and that other features illustrated in FIG. 4 may be included in the embodiment illustrated in FIG. 6.

Figure 7:
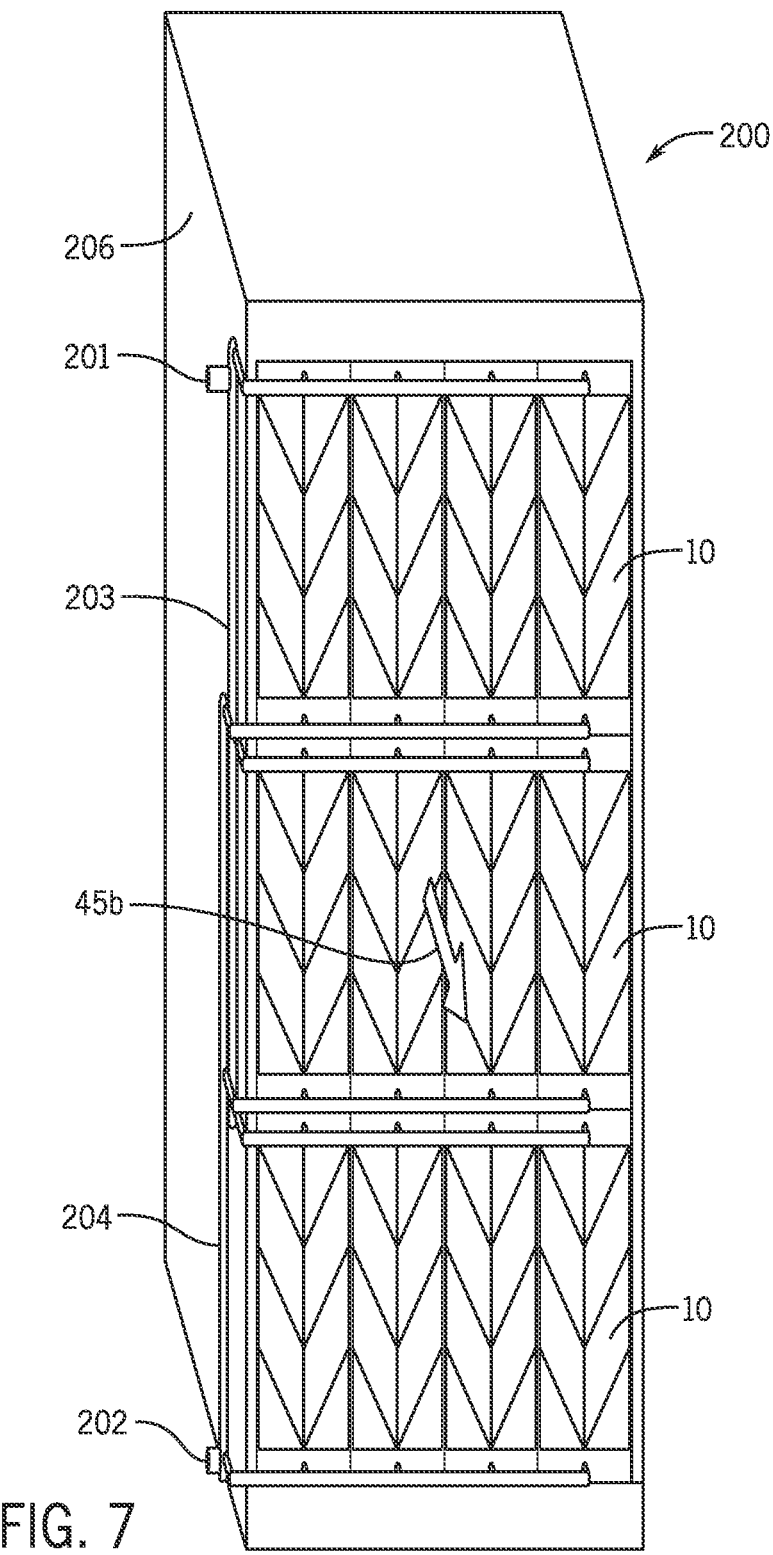
FIG. 7 is an isometric view of an air conditioner employing a matrix of evaporative cooling units, a housing to frame and support the evaporative cooling units, and one possible configuration for water distribution plumbing connected to and from each evaporative cooling unit, in accordance with an aspect of the present disclosure.

An air conditioner 200 of the present disclosure is shown in FIG. 7. The air conditioner 200 contains a matrix of evaporative cooling units 10, a housing structure 206, a water inlet port 202, which attaches to a supply water distribution manifold 204, and a water outlet port 201, which connects to a return water collection manifold 203. In this embodiment, the matrix of evaporative cooling units 10 is installed in a flat-banked configuration in a structured matrix; however, individual units of this disclosure can be altered into various orientations and configurations as outlined in subsequent figures. The water inlet 202 supplies water to the matrix of evaporative cooling units 10 through the supply water distribution manifold 204; conversely, the return water collection manifold 203 collects water that flows out from the matrix of evaporative cooling units 10 and discharges it through the water outlet port 201. Although FIG. 7 depicts one possible configuration where the water inlet port 202 is located at the bottom of the air conditioner 200 and the water outlet port 201 is located at the top of the air conditioner 200, it should be noted that the water inlet port 202 and water outlet port 201 locations can be situated at other relative orientations or positions on the housing structure 206. Furthermore, water flows through the hollow fibers within evaporative cooling unit 10 using a fluid moving device (e.g. a pump) that is external to the air conditioner 200. As air flows through the matrix of evaporative cooling units 10 it contacts the external surfaces of the fibers and is subsequently cooled and/or humidified to the required supply air conditions. A proportion of the water volume flowing through the hollow membrane fibers evaporates into the air stream through the pores in the fiber wall in the form of water vapor. Air flow 45b depicts the conditioned discharge air. The air conditioner 200 is a self-contained and self-supported unit that may be incorporated into air handling systems or other evaporative cooling and/or humidification applications in various orientations.

Figure 8:
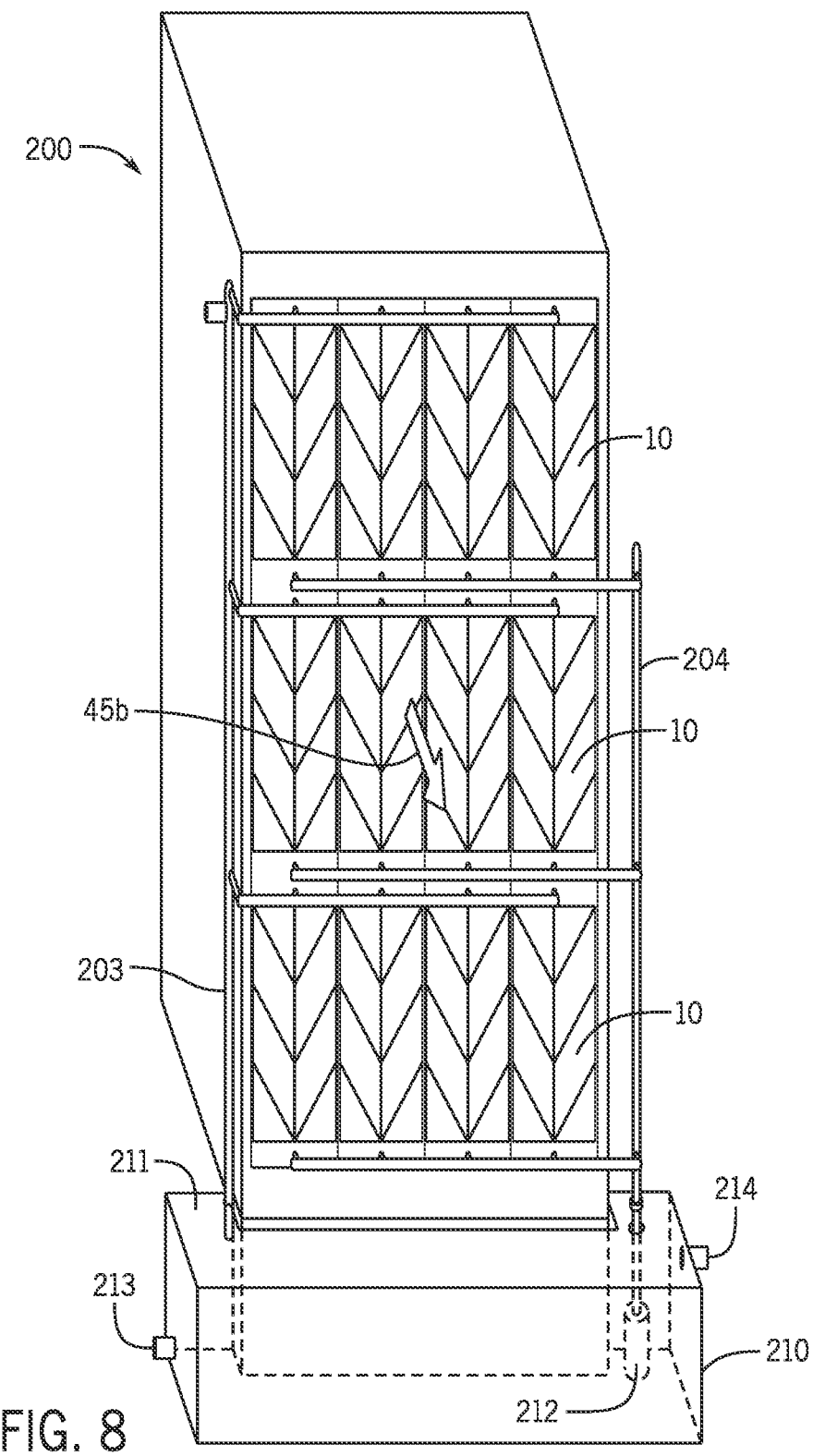
FIG. 8 is an isometric view of an air conditioner employing a matrix of evaporative cooling units, which has an optional water storage tank attached to the bottom of the air conditioner to provide a means of recirculating water to the evaporative cooling units for the purpose of decreasing the overall usage of water, in accordance with an aspect of the present disclosure.

Another embodiment of the air conditioner 200, wherein a water storage tank 210 is attached to the base of the housing structure 206 is shown in FIG. 8. The water storage tank 210 provides a means to collect the water that is discharged from the matrix of evaporative cooling units 10 and recirculate it back to the evaporative cooling units 10. To do so, water flows from the water storage tank 210 up to the supply water distribution manifold 204 through the action of a fluid moving device (e.g. a pump) 212. Once in the supply water distribution manifold 204, the water is distributed out to the evaporative cooling units 10 and circulates within the hollow fibers of the evaporative cooling units 10. Water is subsequently discharged from the evaporative cooling units 10 into the return water collection manifold 203. From the return water collection manifold 203, the water flows back into the water storage tank 210. As the water follows this circulation pattern, air flow 45b moves through the evaporative cooling units 10 and is conditioned in the process. Moreover, it should be noted that, as illustrated, FIG. 8 shows a removable cover 211 which is placed on top of the water storage tank 210. In one embodiment, the cover 211 may be left on so as to protect the water source from any contaminants. However, in another embodiment, the cover 211 may be removed so as to leave the water open to the environment. When necessary, water can be drained from the water storage tank to an external on-site drain system through the outlet 213; fresh make-up water can enter from the source inlet 214 in order to compensate for the water which leaves through the evaporation process and draining.

Figure 9:
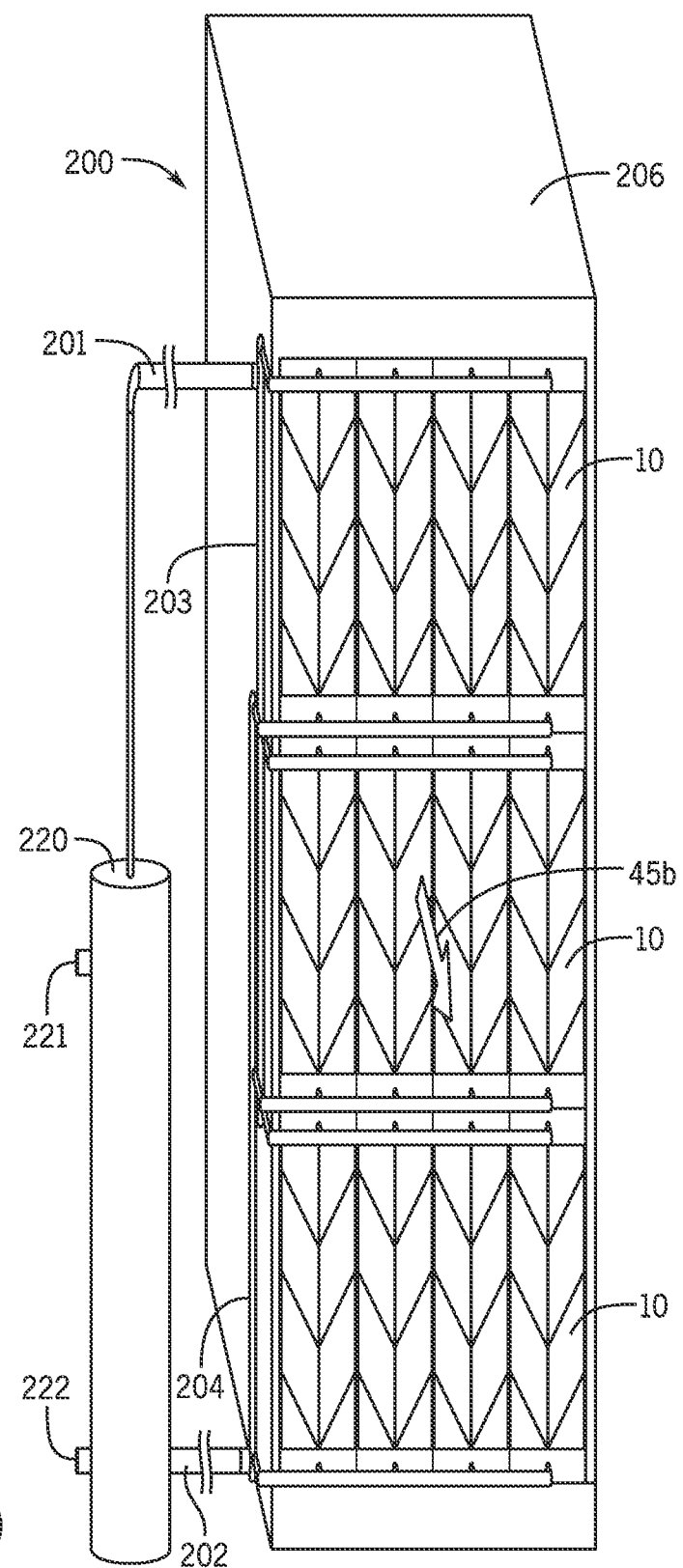
FIG. 9 is an isometric view of an air conditioner employing a matrix of evaporative cooling units, which has an optional water storage tank that is positioned in a remote location for the dual purposes of recirculating water to the evaporative cooling units so as to decrease water usage and minimizing the overall size of the air conditioner, in accordance with an aspect of the present disclosure.

Another embodiment of the air conditioner 200, wherein a remote water storage tank 220 is connected to the air conditioner 200, is shown in FIG. 9. This embodiment is in contrast to the embodiment shown in FIG. 8 where the storage tank is not in a remote location, but rather is attached directly below the air conditioner housing structure 206. Just as with FIG. 8, the connected remote water storage tank 220 in this embodiment provides a means to collect the water that is discharged from the matrix of evaporative cooling units 10 for potential recirculation. However, the design illustrated in FIG. 9 provides an additional advantage: for air conditioners of identical overall size, there is more surface area available for the matrix of evaporative cooling units in FIG. 9 compared with FIG. 8 because the remote water storage tank 220 is in a physically different location. Moreover, in this embodiment water flows out of the remote water storage tank 220 through the water inlet port 202 into a supply water distribution manifold 204. The water is then distributed to the matrix of evaporative cooling units 10 and subsequently discharged into the return water collection manifold 203. From there, the water moves through the water outlet port 201 and back into the remote water storage tank 220. When necessary, water can be drained from the remote water storage tank 220 through the tank water outlet 222 to an external on-site drain system. Fresh make-up water can then enter through the tank water inlet 221 to compensate for the water that is lost.

Figure 10:
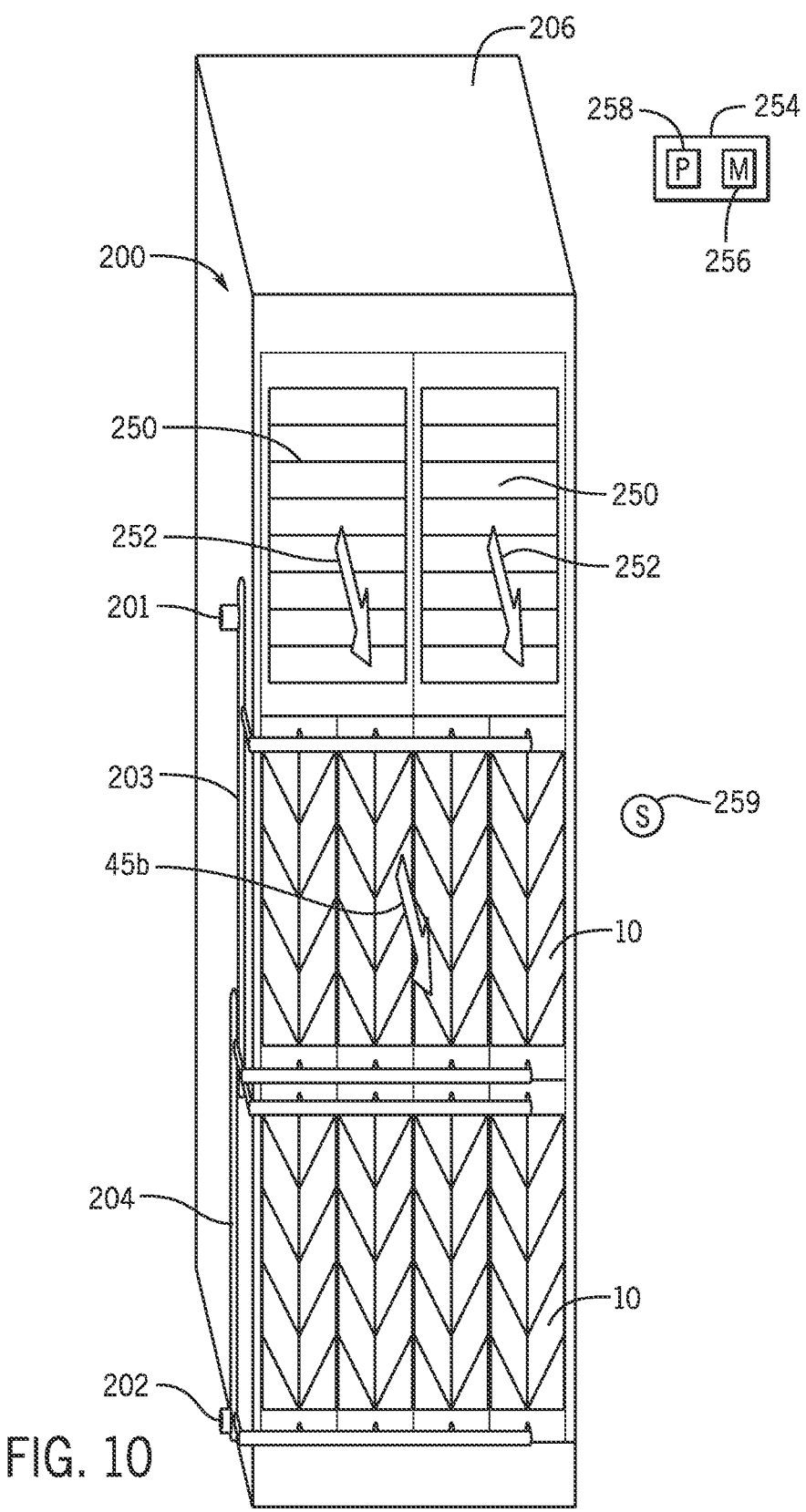
FIG. 10 is an isometric view of an air conditioner employing a matrix of evaporative cooling units, and which incorporates the use of horizontal bypass dampers to provide increased control of the air stream passing through the air conditioner, in accordance with an aspect of the present disclosure.

Another embodiment of the air conditioner 200, where air bypass dampers 250 have been incorporated into the housing 206 of the air conditioner 200, is shown in FIG. 10. As an airstream approaches the air conditioner 200, it now has two paths it can potentially go through. When the air bypass dampers 250 are completely closed, the air flow 45b will exit strictly through the matrix of evaporative cooling units 10, just as it did before. However, as the air bypass dampers 250 are opened, bypass air 252 will pass through the air bypass dampers 250 and exit the air conditioner 200 unconditioned, and the rest of the air 45b will move through the evaporative cooling units 10. In the instance where the dampers are completely opened, the maximum amount of bypass air 252 (as per the design sizing) will pass through the air bypass dampers 250 and a reduced air flow 45b will exit through the evaporative cooling units 10. A controller 254 in FIG. 10 includes a memory 256 and a processor 258. The memory 256 includes instructions stored thereon that, when executed by the processor 258, causes the processor 258 to perform various functions. The controller 254 may be utilized, for example, to open and close the bypass dampers 250. In some embodiments, the controller 254 may be communicatively coupled with a sensor 259 configured to detect one or more operating condition of the air conditioner 200. For example, the sensor 259 may detect an air flow temperature, an air flow rate, an air flow pressure, an air flow humidity, a power consumption of the air conditioner 200, an operating efficiency of the air conditioner 200, a sound of the air conditioner 200, or the like. The controller 254 may receive data indicative of the one or more operating conditions of the air conditioner 200 and determine a position of the bypass dampers 250 based on the sensor data.

In one embodiment, water enters through the water inlet port 202 and up into the supply water distribution manifold 204. The water then circulates through the microporous hollow fibers of the evaporative cooling units 10 and out into the return water collection manifold 203. Finally, water leaves through the water outlet port 201. In another possible embodiment, the water inlet and water outlet ports are reversed. Another embodiment of the air conditioner 200, wherein the details are the same as with FIG. 10, except that the air bypass dampers 260 are now positioned vertically, is shown in FIG. 11.

The embodiments shown in FIG. 7 through FIG. 11 are not to be considered as separate designs, but rather as a subset of a plurality of possible features, all of which are not explicitly illustrated, that build off the base design of the embodiment shown in FIG. 4. Any one feature shown in the above figures may be combined with any other feature to produce an air conditioner 200 that is unique and customized for the desired application.

Figure 11:
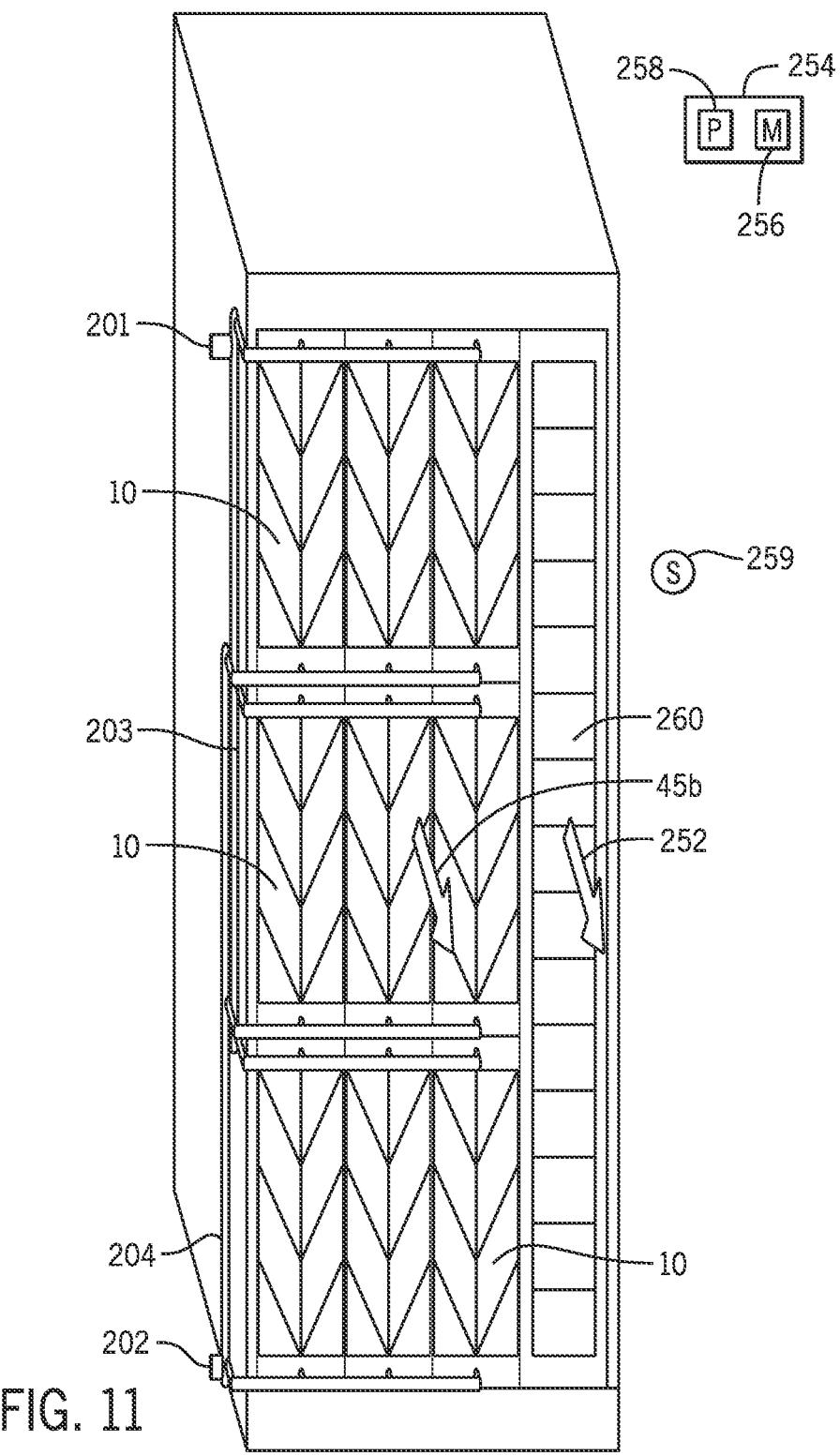
FIG. 11 is an isometric view of an air conditioner employing a matrix of evaporative cooling units, and which incorporates the use of vertical bypass dampers to provide increased control of the air stream passing through the air conditioner, in accordance with an aspect of the present disclosure.
Figure 12:
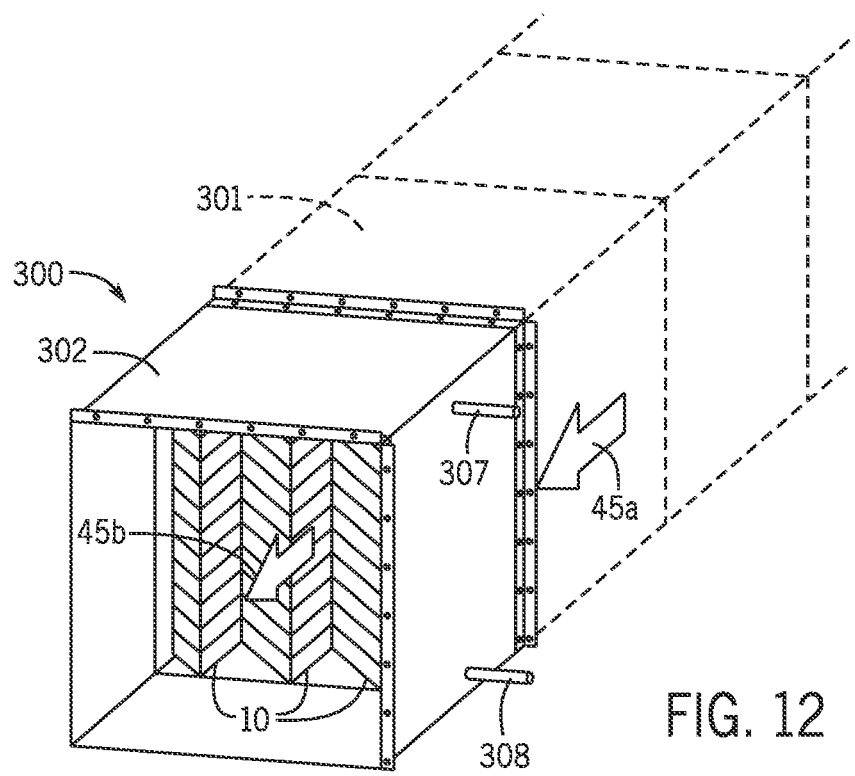
FIG. 12 is an isometric view of an air conditioner employing one or more evaporative cooling units and incorporated in a ducting system, in accordance with an aspect of the present disclosure.

Another possible application of the evaporative cooling units 10, in accordance with the present disclosure, includes an air conditioner 300 within a ducting system 301, as shown in FIG. 11. The air conditioner 300 includes a duct-housing 302 which contains one or more instances of the evaporative cooling unit 10. An unconditioned air flow 45a moves through ducting system 301 and then subsequently through the evaporative cooling units 10. An exiting airflow 45b is cooled and humidified through interaction with the fluid moving within the microporous hollow fibers of the evaporative cooling units 10. In one embodiment, the fluid enters the evaporative cooling units 10 through a water inlet ports 307, circulates within the evaporative cooling units 10, and then leaves through the water outlet port 308. As previously described, multiple instances of the port 307 and the port 308 may be included in certain embodiments (e.g., one per evaporative cooling unit 10).

Figure 13:
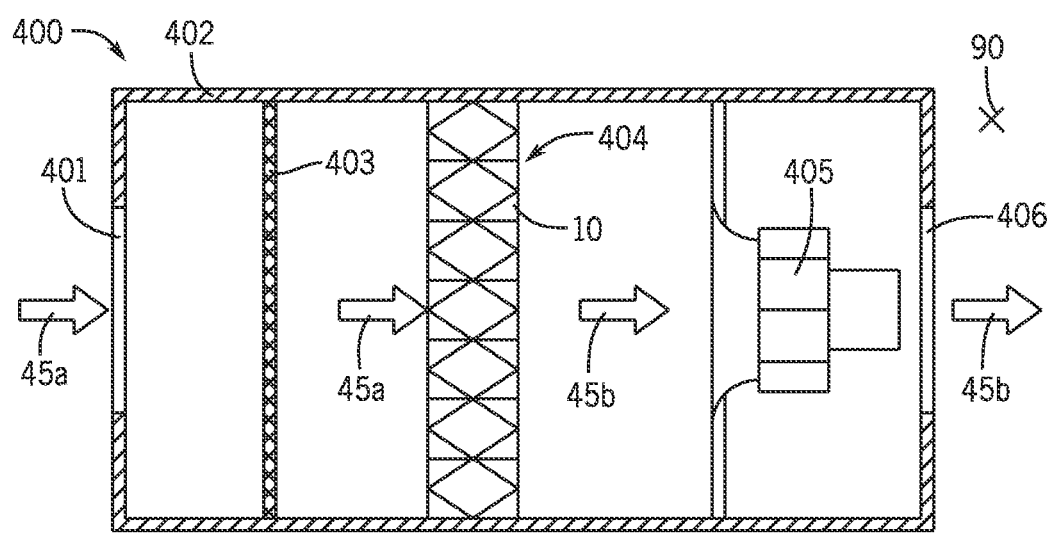
FIG. 13 is an illustration of an air conditioner employing one or more evaporative cooling units and incorporated within an air handling unit (AHU), in accordance with an aspect of the present disclosure.

Another possible application of the evaporative cooling units 10, in accordance with the present disclosure, includes an air conditioner 404 incorporated within an air handling unit (AHU) 400, as shown in FIG. 13. In this embodiment, the AHU 400 is defined by its outer casing 402. Unconditioned air flow 45a enters through opening 401, moves through a set of filters 403, and then enters the evaporative cooling units 10. As the incoming air 45a passes through the evaporative cooling units 10, the air is cooled and/or humidified and exits the air conditioner as conditioned air 45b. Next, the conditioned air 45b is drawn into an air movement device (e.g. a fan) 405, and then exits the AHU 400 through opening 406.

Figure 14:
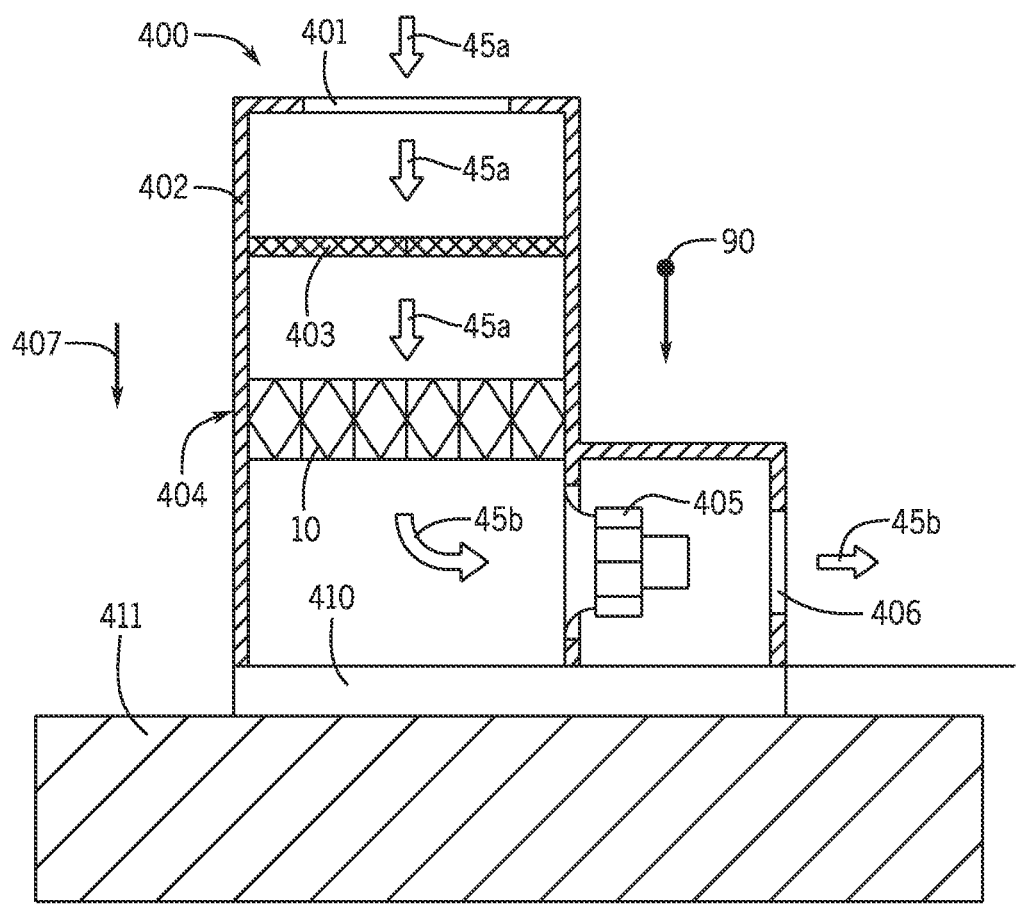
FIG. 14 is an illustration of an air conditioner employing one or more evaporative cooling units and incorporated into an air handling unit (AHU) in a way such that the air flow direction through the one or more evaporative cooling units is parallel to the direction of gravity, highlighting an ability of the evaporative cooling unit(s) to be oriented in any direction, in accordance with an aspect of the present disclosure.

Another possible application of the evaporative cooling units 10, in accordance with the present disclosure, includes the air conditioner 404 incorporated into the air handling unit (AHU) 400 illustrated in FIG. 14. In FIG. 14, the air flow 45a as it approaches the evaporative cooling units 10 of the air conditioner 404 is substantially parallel with the gravity vector 90, unlike in FIG. 13. As shown, the incoming (or unconditioned) air flow 45a is directed in an airflow direction 407 substantially parallel with the gravity vector 90 and through a flow path 407 defined by the outer casing 402 (or enclosure) of the AHU 400. It should be noted that the airflow direction 407 may correspond to an average or general airflow direction through the flow path 408, and that travel of certain individual particles of the air flow 45a may differ. It should be understood that the presently disclosed AHU 400 example in FIGS. 13 and 14 are non-limiting, and that the evaporative cooling units 10 may be oriented differently in other embodiments. Further, unlike certain types of traditional evaporative cooling units, the evaporative cooling units 10 employing the microporous hollow fibers may be oriented at any angle without causing water carryover, as previously described.

Figure 15:
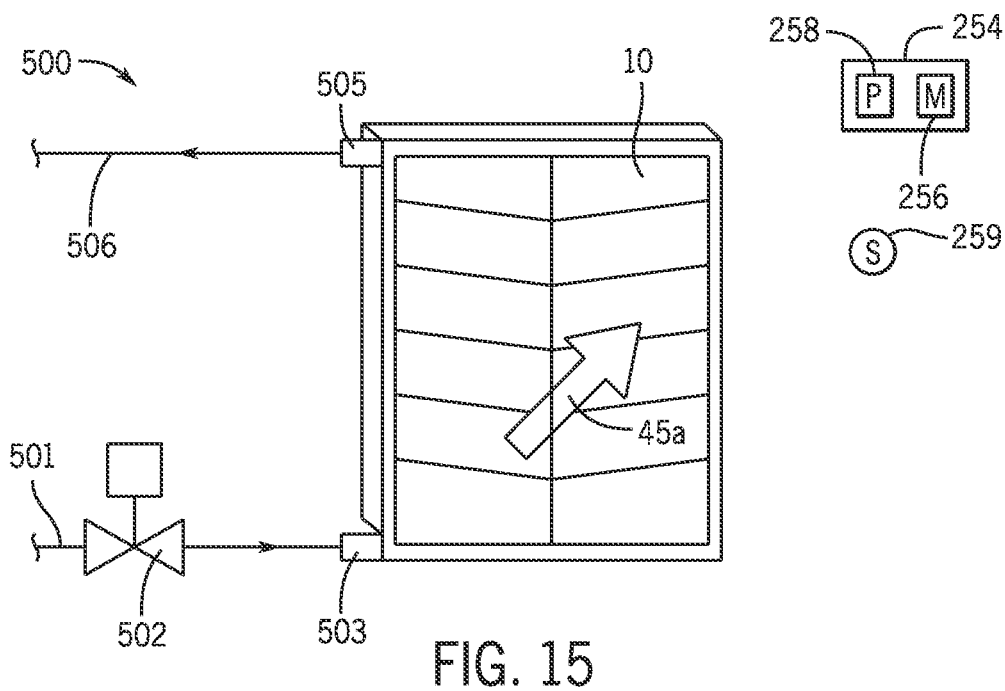
FIG. 15 is a diagram of a possible plumbing scheme of an individual evaporative cooling unit, wherein a single supply water line and a single return water line is routed to and from the evaporative cooling unit, respectively, in accordance with an aspect of the present disclosure.

A plumbing system 500 for an individual evaporative cooling unit 10 is shown in FIG. 15. The individual evaporative cooling unit 10 may be installed in any of the aforementioned embodiments of the present disclosure. The plumbing system 500 comprises a water supply line 501 routed to the water inlet port 503 of the individual evaporative cooling unit 10, a water return line 506 routed from the water outlet port 505 of the individual evaporative cooling unit 10, and a control valve 502. The water supply line 501 distributes water that is pumped from an upstream water supply source (not shown in FIG. 16) to the individual evaporative cooling unit 10. Water flows through the microporous hollow fibers residing in the individual evaporative cooling unit 10, and comes in contact with dry, warm process air 45a that is directed through the individual evaporative cooling unit 10. The intake air 45a flows through the individual evaporative cooling unit 10 and is subsequently cooled and/or humidified. The water return line 506 discharges the residual volume of water that has not been evaporated to an optional integral or external storage tank for recirculation and/or drainage. The control valve 502 regulates the fluid flow rate of the plumbing circuit and may be installed at the water supply line 501 or the water return line 506. The controller 254 may operate to control a position of the valve 502 (e.g., an open position, a partially open position, a closed position). Other appurtenances adjunct to the plumbing system 500 including, but not limited to, water filtration devices, water meters, water hammer arrestors, backflow preventers, as well as instrumentation devices, may be included into the system to meet specific application requirements.

Figure 16:
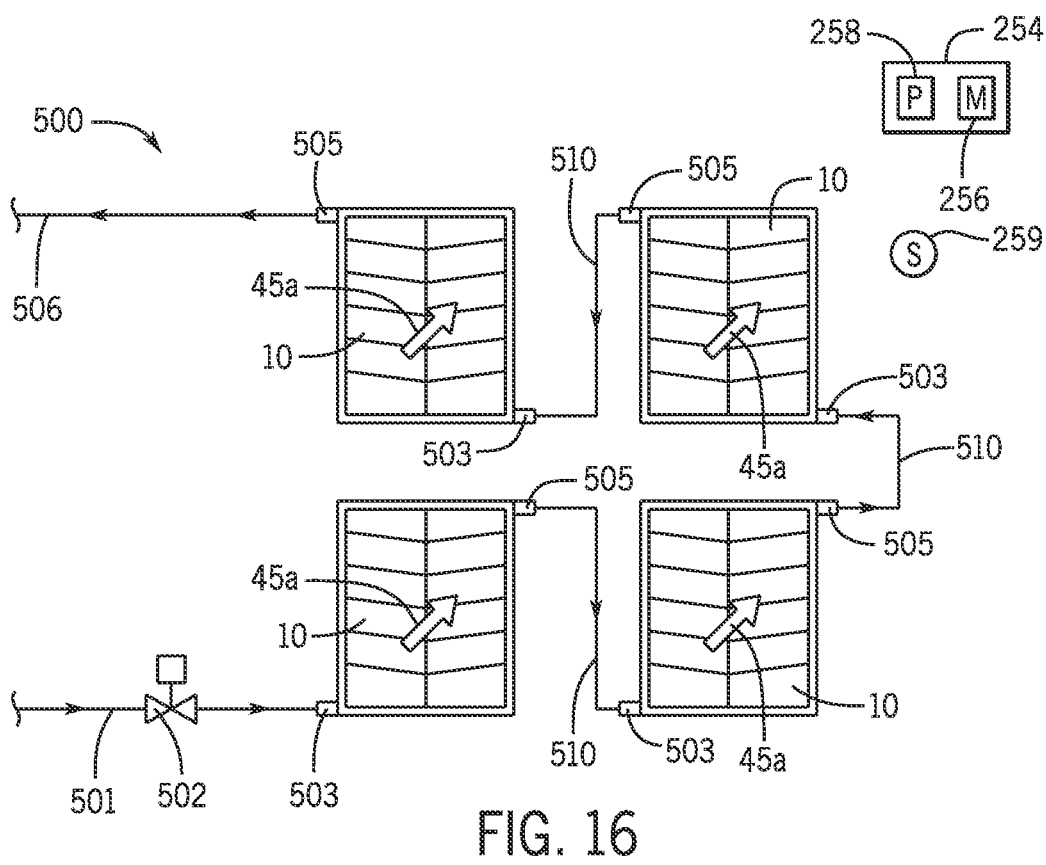
FIG. 16 is a diagram of a possible plumbing scheme of a plurality of evaporative cooling units routed in series, where a single supply water line and a single return water line is routed to and from the plurality of evaporative cooling units, respectively, in accordance with an aspect of the present disclosure.

A possible plumbing scheme for a plurality of individual evaporative cooling units 10 is shown in FIG. 16. In this embodiment, the evaporative cooling units 10 are plumbed in series such that the residual water volumes discharged from the water outlet port 505 of unit 10 enters the water inlet port 503 of a subsequent unit 10 using intermediate piping 510. The control valve 502 regulates fluid flow to the entire series of units 10 and may be located at either the water supply line 501 or the water return line 502. As previously described, the controller 254 may control the control valve 502 to regulate fluid flow. The intake air 45a flows through the face of each evaporative cooling unit 10 and is subsequently cooled and/or humidified.

Figure 17:
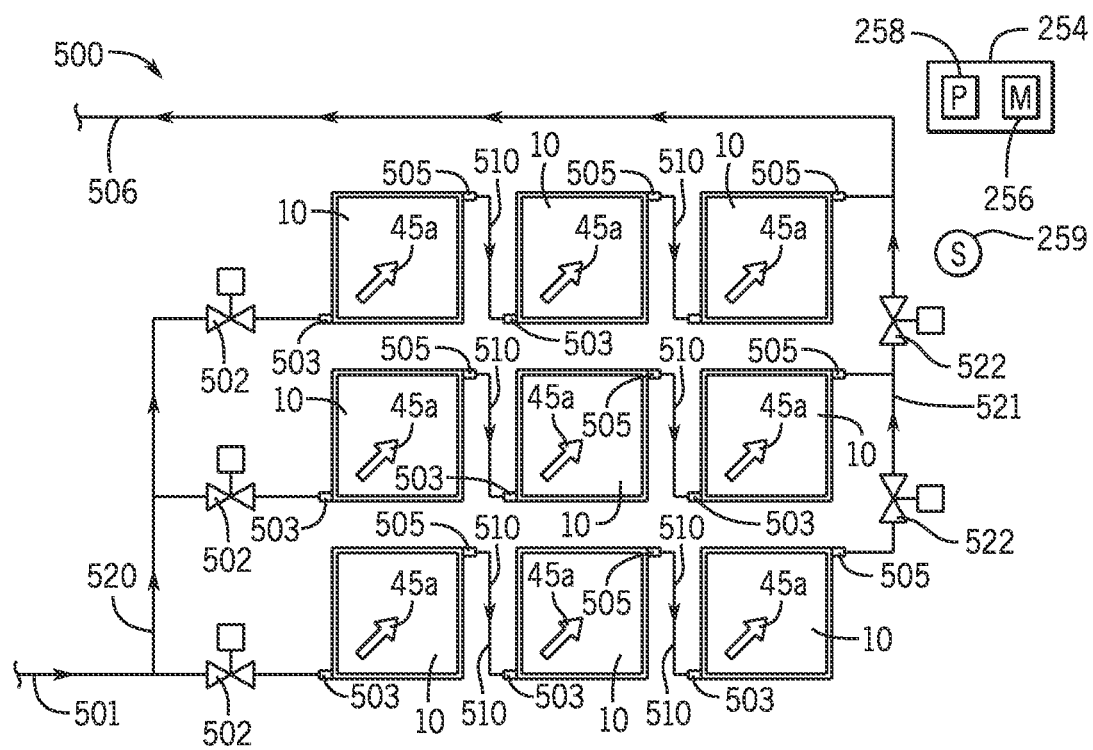
FIG. 17 is a diagram of a possible plumbing scheme of a plurality of evaporative cooling units routed both in series and in parallel, where a supply distribution manifold delivers water to the plurality of evaporative cooling units, and a return water manifold discharges water from the plurality of evaporative cooling units for recirculation and/or drainage, the possible plumbing scheme allowing for each individual group of evaporative cooling units to be selectively activated and deactivated, in accordance with an aspect of the present disclosure.

A further possible plumbing scheme for a plurality of evaporative cooling units 10 is shown in FIG. 17. It should be noted that the evaporative cooling units 10 in FIG. 17 are illustrated schematically as boxes, but may resemble the evaporative cooling units 10 of previously described drawings (e.g., including the microporous hollow fibers wound in a closed-loop [e.g., rhombus] shape). In the embodiment illustrated in FIG. 17, the evaporative cooling units 10 are plumbed both in series and in parallel such that a multitude of control valves 502 regulates flow to distinct groups of evaporative cooling units 10 within the matrix. The controller 254 may control the multitude of control valves 502 collectively or independently. Each group of evaporative cooling units 10 can be selectively activated to provide cooling needs. The water supply line 501 is connected to a supply water distribution manifold 520 that directs water to the water inlet ports 503 of each group of evaporative cooling units 10. Within each group of evaporative cooling units 10, water discharged from the water outlet port 505 of one evaporative cooling unit 10 enters the water inlet port 503 of a subsequent evaporative cooling unit 10 within the series using intermediate piping 510. A return water collection manifold 521 directs residual water volumes from each group of evaporative cooling units 10 to the water return line 506 for eventual recirculation and/or drainage. The control valves 502 may be located at outlet connections of the supply water distribution manifold 520, or the inlet connections of the return water collection manifold 521. Isolation valves 522 may be included to provide flow logic and prevent backflow to certain evaporative cooling unit groups. The intake air 45a flows through each evaporative cooling unit 10 and is subsequently cooled and/or humidified.

Figure 18:
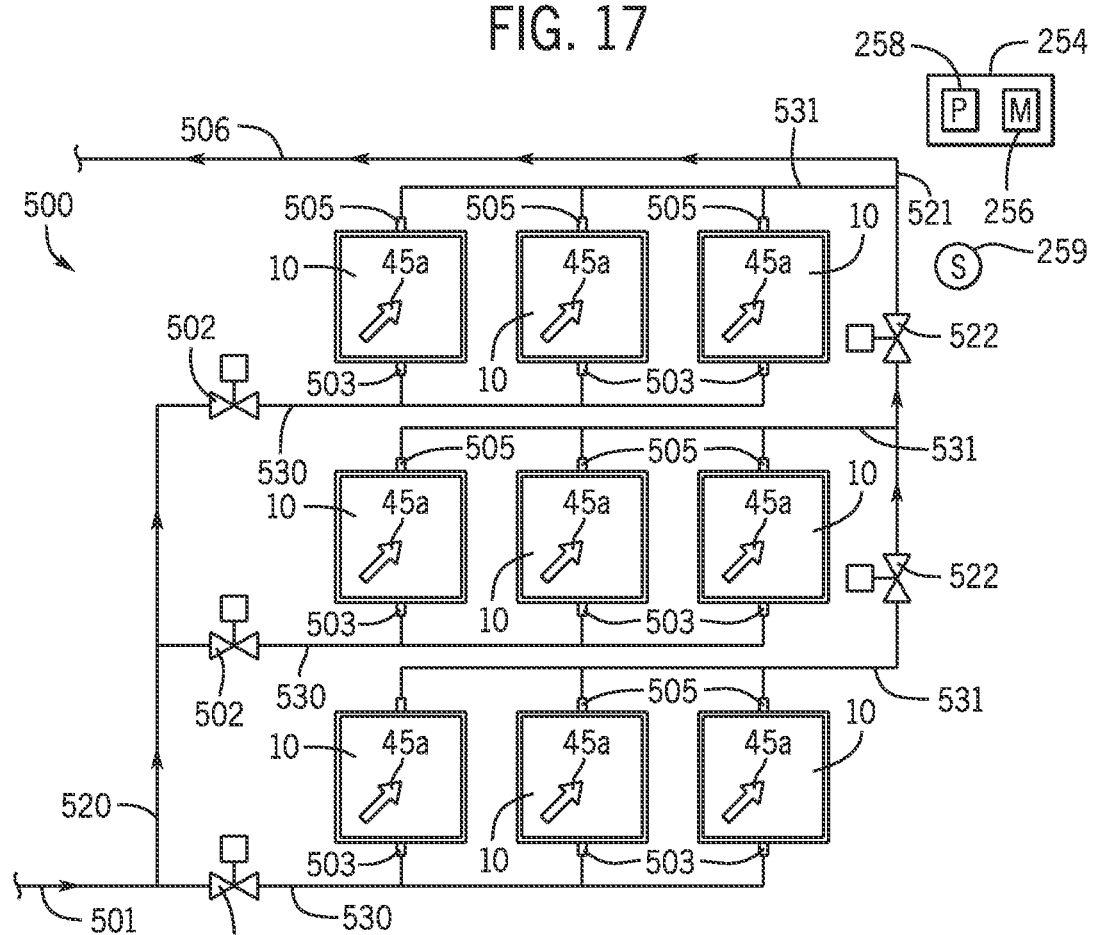
FIG. 18 is a diagram of a possible plumbing scheme of a plurality of evaporative cooling units routed in parallel, where a common supply distribution manifold delivers water to a plurality of supply water branch piping which in turn delivers water to the plurality of evaporative cooling units, and wherein a plurality of return water branch piping receives return water from the plurality of evaporative cooling units and discharges it to a common return water manifold for eventual recirculation and/or drainage, the possible plumbing scheme allowing for each individual group of evaporative cooling units to be selectively activated and deactivated, in accordance with an aspect of the present disclosure.

A further possible plumbing scheme for a plurality of individual evaporative cooling units 10 is shown in FIG. 18. It should be noted that the evaporative cooling units 10 in FIG. 18 are illustrated schematically as boxes, but may resemble the evaporative cooling units 10 of previously described drawings (e.g., including the microporous hollow fibers wound in a closed-loop [e.g., rhombus] shape). In the embodiment illustrated in FIG. 18, the evaporative cooling units 10 are plumbed in parallel such that a multitude of control valves 502 (and the controller 254 configured to control the multitude of control valves 502) regulates flow to distinct groups of evaporative cooling units 10 within the matrix. In addition to the previously mentioned supply water distribution manifold 520 and return water collection manifold 521 shown in FIG. 17, FIG. 18 illustrates the use of branch piping (530 and 531) to direct water to and from each group of evaporative cooling units 10, respectively. Branch piping 530 is routed from the supply water distribution manifold 520 to the water inlet port 503 of each evaporative cooling unit 10 within a designated group. Branch piping 531 is routed from the water outlet port 505 of each evaporative cooling unit 10 within a designated group to the return water collection manifold 521. This plumbing scheme represents the use of reverse return piping, wherein the overall system flow is divided into approximately equal streams that pass through the evaporative cooling units 10. The control valves 502 may be located at outlet connections of the supply water distribution manifold 520, or the inlet connections of the return water collection manifold 521. Optional balancing valves may be used in the system to fine-tune flow rates as needed. Isolation valves 522 may be included to provide flow logic and prevent backflow to certain evaporative cooling unit groups. The intake air 45a flows through the evaporative cooling units 10 and is thereby cooled and/or humidified, as previously described.

Figure 19:
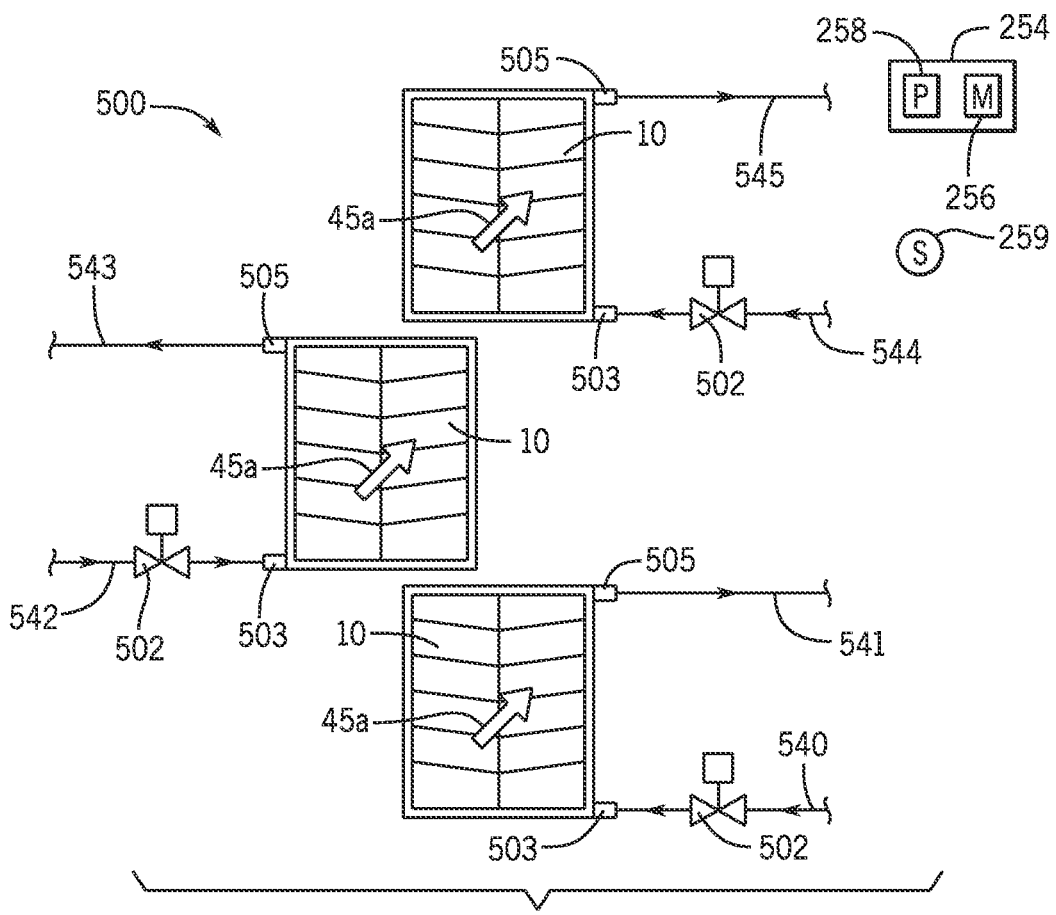
FIG. 19 is a diagram of a possible plumbing scheme of a plurality of evaporative cooling units that are individually routed to independent water supply sources and possible independent drainage sources, the possible plumbing scheme allowing for each individual evaporative cooling unit to be selectively activated and deactivated, in accordance with an aspect of the present disclosure.

A further possible plumbing scheme for a plurality of evaporative cooling units 10 is shown in FIG. 19. In this embodiment, each evaporative cooling unit 10 is plumbed to its own water supply source. Separate supply lines (540, 542, 544) direct water from separate water supply sources to each evaporative cooling unit 10; separate return lines (541, 543, 545) direct residual water volumes from evaporative cooling units 10 to individual or common reservoirs for recirculation and/or drainage. A multitude of independent control valves 502 regulate the water flow of each evaporative cooling unit 10, allowing for selective activation of each evaporative cooling unit 10 for application-specific cooling needs. The intake air 45a flows through each evaporative cooling unit 10 and is subsequently cooled and/or humidified. For example, in an embodiment with two of the evaporative cooling units 10 and, thus, two valves 502, both valves 502 may be controlled by the controller 254 to an open position, both valves 502 may be controlled by the controller 254 to a closed position, and one valve 502 may be controlled by the controller 254 to an open position while the other valve 502 may be controlled by the controller 254 to a closed position. As previously described, the controller 254 may actuate the valves 502 based on data feedback from the sensor 259. Additionally or alternatively, the controller 254 may receive an input (e.g., from an operator) and control the valves 502 based on the input.

All plumbing schemes described herein can be infinitely scaled to match the total quantity of evaporative cooling units 10 within the system. The flexibility and ease of adding or removing evaporative cooling units 10, and combining and/or interchanging plumbing schemes allows for autonomous infinite capacity and precise demand-matching control strategies.

Figure 20:
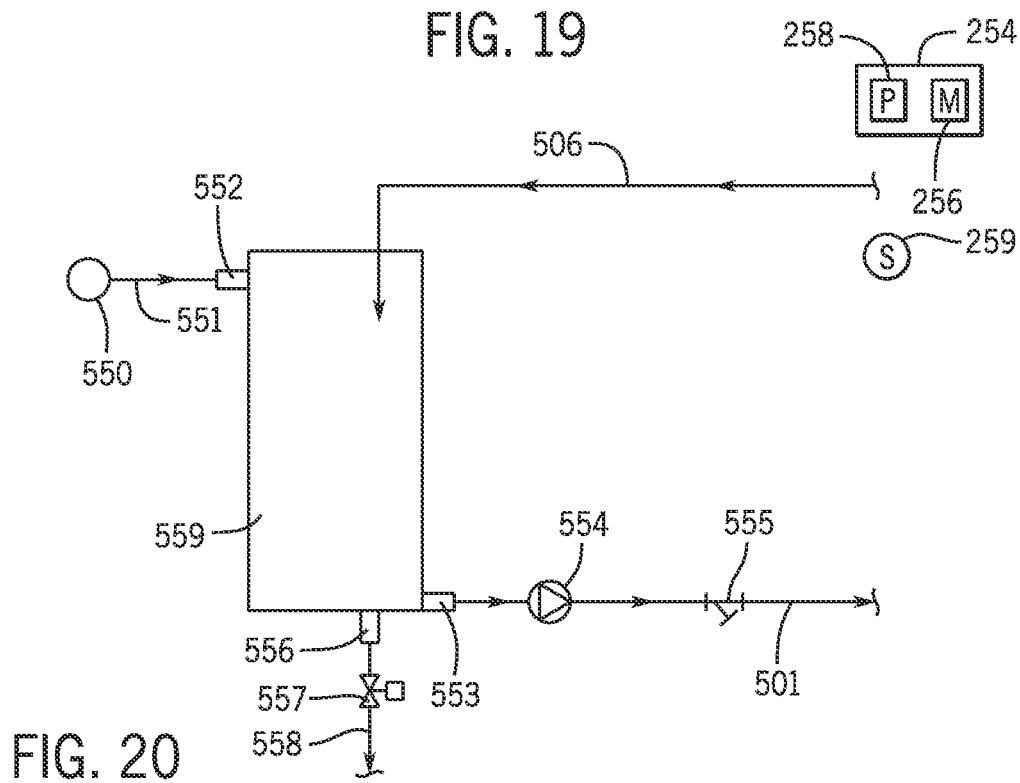
FIG. 20 is a plumbing scheme of an optional water storage tank, wherein a make-up water line connects a water supply to the storage tank, a supply line distributes water from the tank to the evaporative cooling units, a return line directs water from said evaporative cooling units back to the storage tank, and a drain line that allows for drainage of the storage tank, in accordance with an aspect of the present disclosure.

An optional water storage tank 559 that may be integral to the air conditioner or located at a remote location is shown in FIG. 20. A supply water source 550 is fed to the inlet 552 of the storage tank 559 by a makeup water line 551. The makeup water line 551 may be connected directly to the supply line 501 if the water storage tank 559 is not required. Makeup water is required for all plumbing schemes described above to maintain a continuous evaporative cooling process. When cooling is required, a fluid moving device (e.g., sump pump or in-line pump 554) is turned on (e.g., by the controller 254), allowing water from the storage tank 559 to exit through the outlet 553 and flow through the supply line 501 to downstream evaporative cooling units. An optional strainer 555 or other water filtration and/or treatment components may be installed to improve quality of water supplied to evaporative cooling units. In recirculation systems, a return line 506 directs residual water volumes discharged from evaporative cooling units back into the water storage tank 559 for reuse or mixing with makeup water. The water storage tank can be drained through a drainage outlet 556 into a drain line 558 by opening a drain control valve 557 (e.g., via the controller 254). An example of a situation requiring tank drainage includes when the concentration of dissolve solids accumulated in the plumbing system needs to be reduced.

Figure 21:
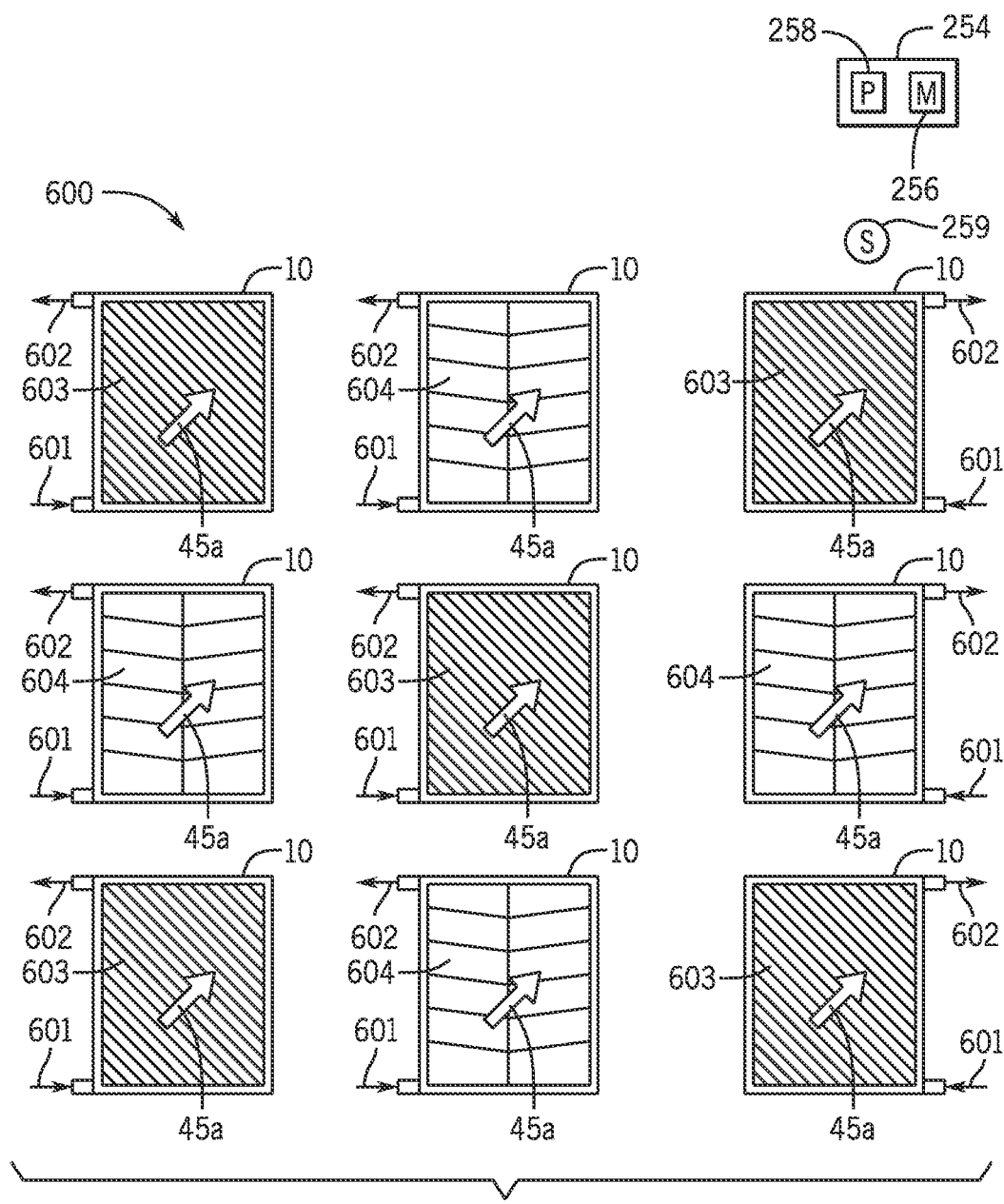
FIG. 21 is a schematic that illustrates a matrix of evaporative cooling units, wherein certain evaporative cooling units are selectively activated to condition air, in accordance with an aspect of the present disclosure.

A control scheme of a plurality of individual evaporative cooling units 10, in accordance with the present disclosure, is shown in the cooling system 600 of FIG. 21. For the cooling system 600, each evaporative cooling unit 10 is individually plumbed to its own supply line 601, return line 602, and control valve 502 (nothing that the control valve[s] 502 are not shown in FIG. 21 but an example of the control valve 502 is shown in FIG. 15). Since control valves 502 can be wired independently of one another, and since evaporative cooling unit 10 is routed to its own water supply, selective evaporative cooling unit 10 can be activated or deactivated (e.g., by the controller 254). FIG. 21 shows both activated evaporative cooling unit 10 (denoted by reference numeral 603) and deactivated evaporative cooling unit 10 (denoted by reference numeral 604). In an embodiment with two evaporative cooling units 10, for example, the controller 254 may control both evaporative cooling units 10 to an activated state (e.g., via valves 502 illustrated in FIG. 19), both evaporative cooling units 10 to a deactivated state (e.g., via valves illustrated in FIG. 19), and one evaporative cooling unit 10 to an activated state and the other evaporative cooling unit 10 to a deactivated state (e.g., via valves 502 in FIG. 19). Furthermore, an activation sequence control scheme can be automated such that the evaporative cooling units 10 can be activated in either a synchronous or an asynchronous manner, subject to predetermined control system delays or setpoint configurations. Evaporative cooling units 10 can also be installed in different zones within an enclosed space or volume to provide area-focused air conditioning.

Figure 22:
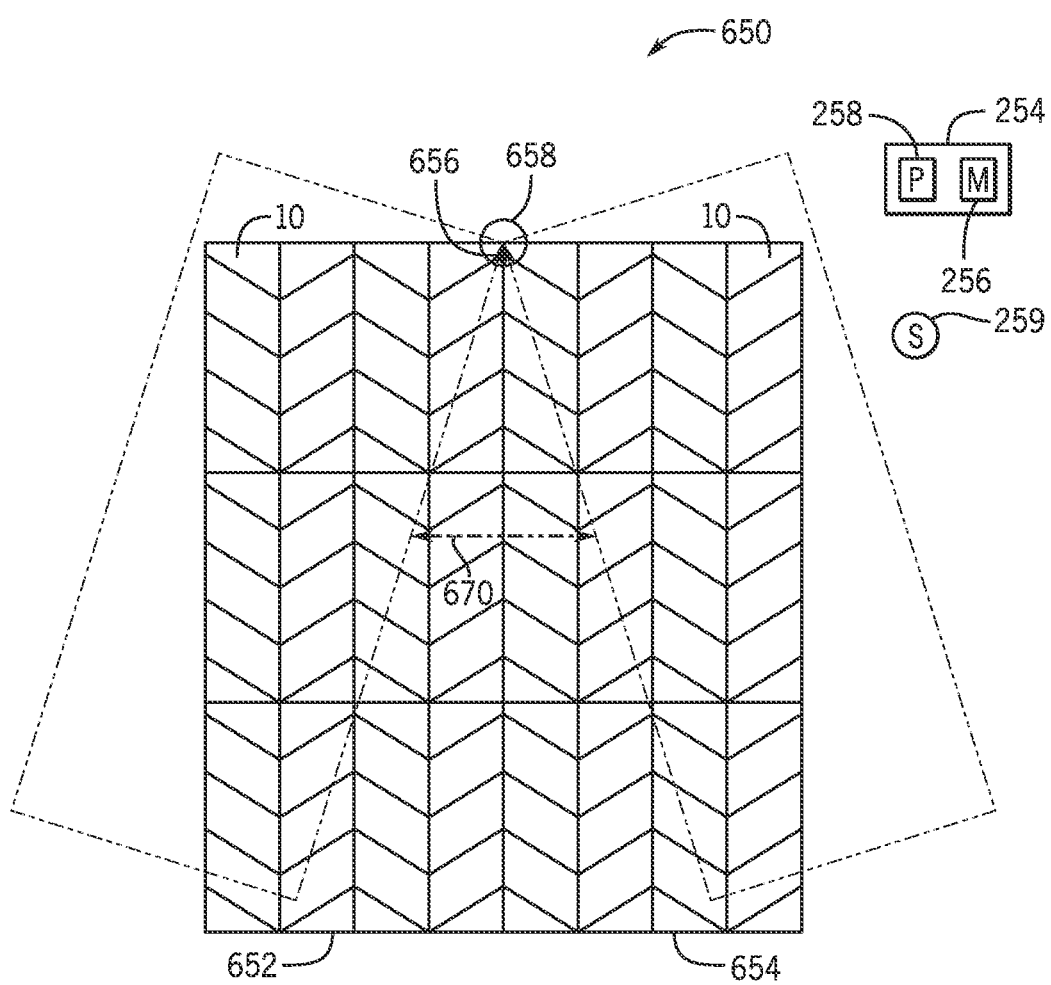
FIG. 22 is an illustration of a possible feature of an air conditioner employing a plurality of evaporative cooling units, wherein two physically distinct matrices of evaporative cooling units meet at a common interface and each of which is hinged to an axis permitting rotation about said axis through the use of an actuating device, in accordance with an aspect of the present disclosure.

A further potential feature and/or application of the evaporative cooling units 10 is illustrated in the air conditioner 650 shown in FIG. 22, wherein two physically distinct matrices (652 and 654) of evaporative cooling units 10 are hinged to a rotation axis 656. Through the use of any potential actuating device (e.g., such as motors 658 controlled by the controller 254), the matrices (652 and 654) are able to rotate about the axis 656. This feature enables different air paths to exist within the air conditioner 650. When the matrices (652 and 654) are rotated such that they are touching at their common interface, a gap 670 therebetween will be closed, and all air will pass through the evaporative cooling units 10 directly creating a conditioned air stream. Conversely, when the matrices (652 and 654) are rotated such that they are no longer touching at the common interface, then a gap 670 exists. In this instance, some air may continue to pass through the evaporative cooling units 10 and will be conditioned; however, some air will bypass the evaporative cooling units 10 and exit the air conditioner 650 unconditioned. The controller 254 may control the motor(s) 658 based on sensor feedback from the sensor 259 or an input entered to the controller 254 (e.g., via an operator).

Figure 23:
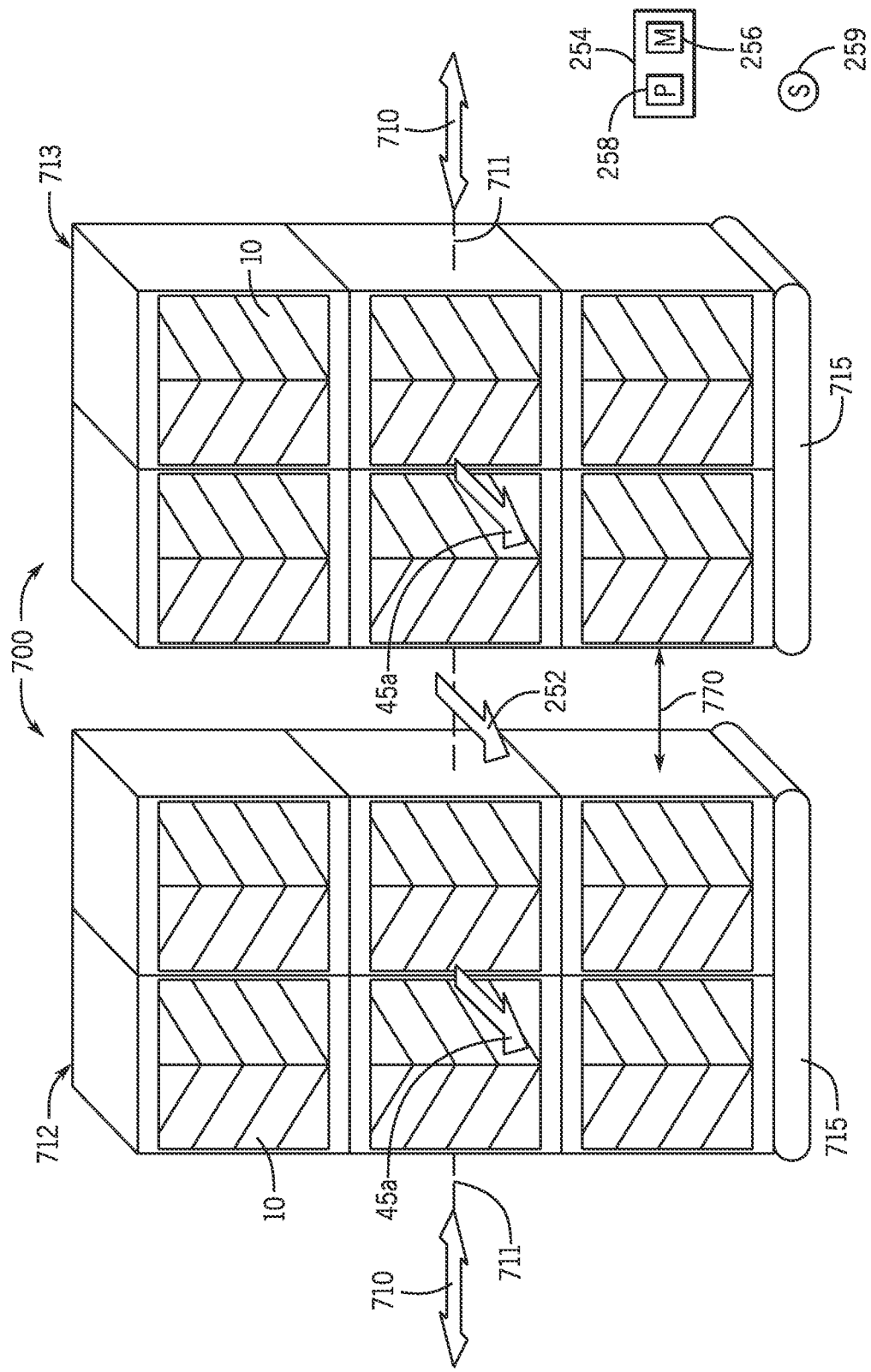
FIG. 23 is an illustration of a possible feature of an air conditioner employing a plurality of evaporative cooling units, wherein two or more physically distinct matrices of evaporative cooling units meet at a common interface and each of which is connected to an axis permitting translation along said axis through the use of an actuating device, in accordance with an aspect of the present disclosure.

A further potential feature and/or application of the evaporative cooling units 10 is illustrated in the air conditioner 700 shown in FIG. 23. In this figure, two physically distinct matrices (712 and 713) of evaporative cooling units 10 are connected to an axis 711 that permits translation 710 perpendicular to the direction of airflow (45*a*) using any potential actuating device. The translation 710 of the matrice(s) 712 and/or 713 of evaporative cooling units 10 may be caused by actuation mechanisms, such as motors 715, controlled by the controller 254 (e.g., based on sensor data from the sensor 259 or an input received by the controller 254 from an operator). This feature enables different air paths to form within the overall air conditioner 700. In one instance, when the matrices (712 and 713) are touching at the common interface, the gap 770 as shown in the figure does not exist. As such, all air 45*a* will exit through the evaporative cooling units 10 and is conditioned (e.g., cooled and/or humidified). Conversely, when the matrices (712 and 713) translate apart (in direction 710), a gap 770 forms between the matrices (712 and 713). This allows some air 45*a* to be conditioned as it moves through the evaporative cooling units 10, while some air 252 bypasses the evaporative cooling units 10 altogether and exits the air conditioner 700 unconditioned.

Figure 24:
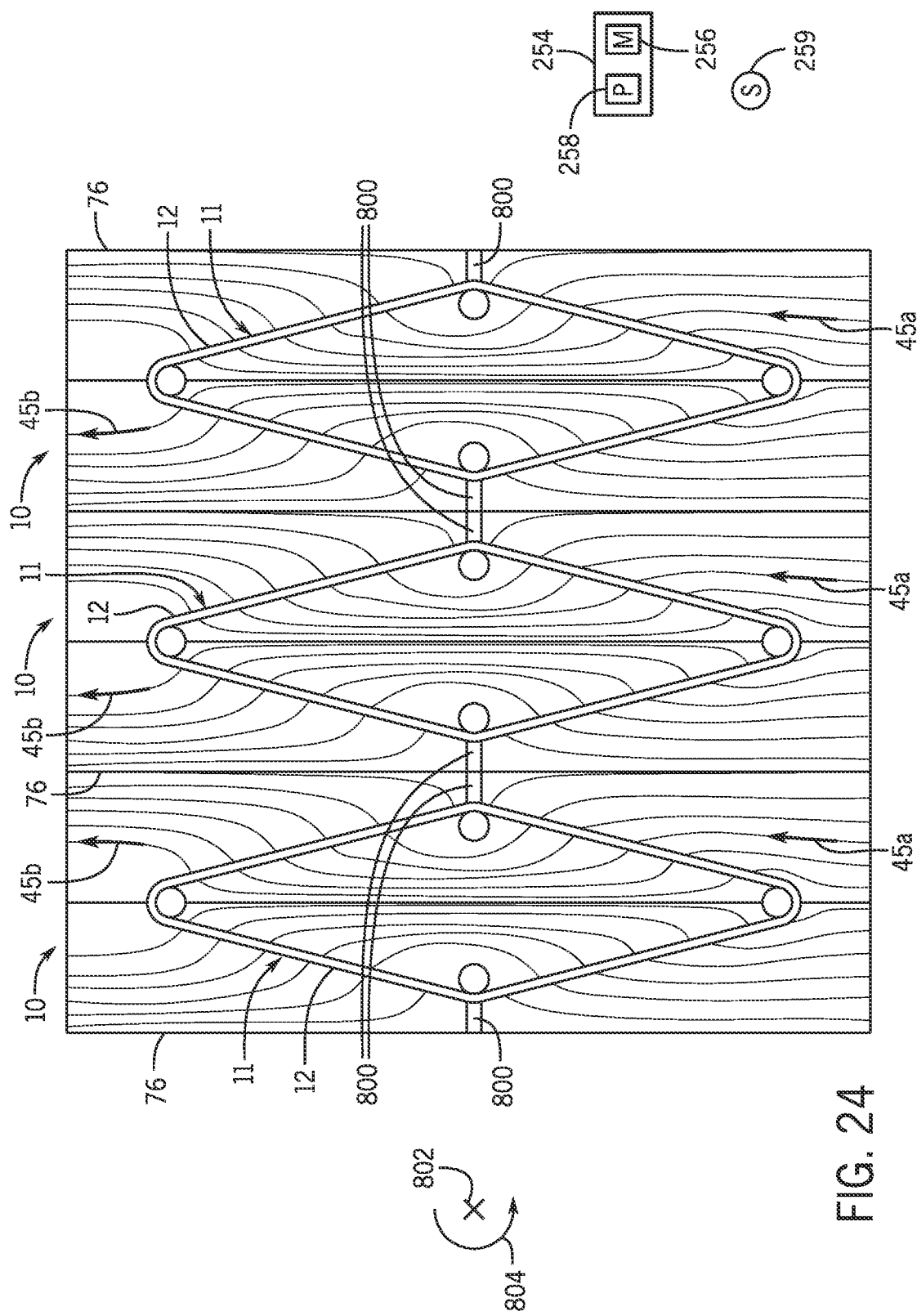
FIG. 24 is an illustration of an air conditioner employing a plurality of evaporative cooling units and bypass features disposed within each evaporative cooling unit of the plurality of evaporative cooling units, in accordance with an aspect of the present disclosure.

System-level air flow bypass features (e.g., that enable at least a portion of an air flow to bypass evaporative cooling units in accordance with the present disclosure) are illustrated in at least FIGS. 10, 11, 22, and 23, and are described in detail above. Another possible air flow bypass feature in accordance with the present disclosure is illustrated in FIG. 24. In FIG. 24, each evaporative cooling unit 10 includes features configured to enable at least a portion of air flow to bypass said evaporative cooling unit 10. For example, as described with respect to at least FIG. 4 above, each evaporative cooling unit 10 may include the winding 11 of microporous hollow fibers 12 forming a closed-loop (e.g., rhombus) shape, contained within a respective frame 76 (or airflow channel) of the respective evaporative cooling unit 10. At a mid-section of each evaporative cooling unit 10, flow blockers 800 may be configured to direct the air flow 45 through the closed-loop (e.g., rhombus) shape, as opposed to bypassing the closed-loop (e.g., rhombus) shape. However, in certain operating conditions, the flow blockers 800 may be actuated to enable an air flow around the closed-loop (e.g., rhombus) shape. In some embodiments, the flow blockers 800 may include columns that can be selectively disposed and removed from the illustrated position. For example, the flow blockers 800 may be moved in a first direction 802 (e.g., into and out of the page from the illustrated perspective), rotated in a circumferential direction 804, or otherwise actuated to define a flow path around the closed-loop (e.g., rhombus) shape of the winding 11 of microporous hollow fibers 12. As previously noted, the controller 254 may operate to control the flow blockers 800 based on sensor feedback from the sensor 259, which detects an operating condition (e.g., air flow temperature, an air flow rate, an air flow pressure, an air flow humidity, a power consumption of the system, an operating efficiency of the system, a sound of the system, etc.).

In general, the presently disclosed evaporative cooling unit 10 employs microporous hollow fibers 12 forming a closed-loop shape, such as a rhombus, configured to improve cooling of an air flow relative to traditional embodiments, and configured to reduce a footprint of the evaporative cooling unit 10 relative to traditional embodiments. Further, various system level features are disclosed that enable operation of the evaporative cooling units 10 within an air conditioner system, such as an air handling unit (AHU), a ducted system, and the like, as previously described. Further still, various system level features are disclosed that enable air flow bypass of the evaporative cooling units 10, selective activation and deactivation of certain evaporative cooling units 10, operation of the evaporative cooling units 10 in series, parallel, or both, and other operative features of the evaporative cooling units 10 and corresponding system. In general, presently disclosed embodiments improve a preciseness and efficiency of air conditioning relative to traditional embodiments, at least in part by way of reducing an air conditioning size or footprint while optimizing an amount of air conditioning that can take place within the size or footprint of the air conditioning system.

The present disclosure is not to be limited in scope by the specific embodiments described herein. Indeed, various modifications of the disclosure in addition to those described herein will become apparent to those skilled in the art from the foregoing description. Such modifications are intended to fall within the scope of the appended claims.

While only certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

All patents, applications, publications, test methods, literature, and other materials cited herein are hereby incorporated by reference.

The invention claimed is:

1. An air conditioning system, comprising:
a plurality of evaporative cooling units, wherein each evaporative cooling unit of the plurality of evaporative cooling units comprises a first V-shaped portion of a winding of microporous hollow fibers that are configured to receive a liquid, a second V-shaped portion of the winding of microporous hollow fibers that are configured to receive the liquid, the first V-shaped portion and the second V-shaped portion being arranged to form a closed-loop rhombus shape, and an internal cavity disposed between the first V-shaped portion and the second V-shaped portion and having a boundary defined by the closed-loop rhombus shape;
a plumbing assembly configured to supply the liquid to the plurality of evaporative cooling units; and
a controller configured to control the plumbing assembly to:
change a flow rate of the liquid; or
block the liquid from at least one evaporative cooling unit of the plurality of evaporative cooling units.

2. The conditioning system of claim 1, wherein the plumbing assembly comprises a valve, and the controller is configured to control the valve to block the liquid from the at least one evaporative cooling unit of the plurality of evaporative cooling units.

3. The conditioning system of claim 1, wherein the plumbing assembly comprises a pump or valve, and the controller is configured to control the pump or valve to change the flow rate of the liquid.

4. The conditioning system of claim 1, wherein a first evaporative cooling unit of the plurality of evaporative cooling units and a second evaporative cooling unit of the plurality of evaporative cooling units are arranged in parallel or in series with respect to a flow of the liquid.

5. The conditioning system of claim 1, wherein a first juncture between the first V-shaped portion and the second V-shaped portion comprises a first curvature, and a second juncture between the first V-shaped portion and the second V-shaped portion comprises a second curvature.

6. An air conditioning system comprising a plurality of evaporative cooling units, a plumbing assembly, and a controller, wherein:
each evaporative cooling unit of the plurality of evaporative cooling units comprises a sheet forming a closed-loop shape comprising a rhombus or rhomboid, the sheet including a plurality of microporous hollow fibers contained therein, each microporous fiber of the plurality of microporous fibers comprising:
one or more walls;
a liquid flow path defined by the one or more walls and configured to receive a liquid; and
a plurality of pores extending through the one or more walls, wherein the plurality of pores is configured to block passage of the liquid therethrough and enable passage of a vapor formed from the liquid therethrough;
the plumbing assembly is configured to supply the liquid to the plurality of evaporative cooling units; and
the controller is configured to control the plumbing assembly to:
change a flow rate of the liquid; or
block the liquid from at least one evaporative cooling unit of the plurality of evaporative cooling units.

7. The air conditioning system of claim 6, wherein each evaporative cooling unit comprises a plurality of anchors about which the sheet is arranged to form the closed-loop shape comprising the rhombus or rhomboid, and such that the closed-loop shape comprising the rhombus or rhomboid forms a boundary about an internal cavity devoid of microporous hollow fibers.

8. The air conditioning system of claim 6, wherein a first evaporative cooling unit of the plurality of evaporative cooling units and a second evaporative cooling unit of the plurality of evaporative cooling units are arranged in parallel with respect to a flow of the liquid.

9. The air conditioning system of claim 6, wherein a first evaporative cooling unit of the plurality of evaporative cooling units and a second evaporative cooling unit of the plurality of evaporative cooling units are arranged in series with respect to a flow of the liquid.

10. The air conditioning system of claim 6, wherein the plumbing assembly comprises a pump or valve, and the controller is configured to control the pump or valve to:
block the liquid from the at least one evaporative cooling unit of the plurality of evaporative cooling units; or
change the flow rate of the liquid.

11. An air conditioning system comprising a plurality of evaporative cooling units, each evaporative cooling unit of the plurality of evaporative cooling units comprising a winding of a plurality of microporous hollow fibers forming a closed-loop rhombus shape having a leading edge, a trailing edge configured to be disposed downstream of the leading edge relative to an air flow, and an internal cavity disposed between the leading edge and the trailing edge and having a boundary defined by the closed-loop rhombus shape.

12. The air conditioning system of claim 11, comprising:
a bypass damper; and
a controller configured to actuate the bypass damper between:
a first position in which at least a portion of the air flow bypasses the plurality of evaporative cooling units; and
a second position in which the air flow passes through the plurality of evaporative cooling units.

13. The air conditioning system of claim 12, comprising a sensor configured to detect an operating condition associated with the air conditioning system, wherein the controller is configured to:
receive feedback from the sensor; and actuate the damper to the first position or the second position based on the feedback.

14. The air conditioning system of claim 11, wherein each evaporative cooling unit of the plurality of evaporative cooling units comprises:
   an inlet configured to receive a liquid into the plurality of microporous hollow fibers; and
   an outlet configured to output the liquid from the plurality of microporous hollow fibers.

15. The air conditioning system of claim 14, comprising a plumbing assembly configured to direct the liquid from the outlet of a first evaporative cooling unit of the plurality of evaporative cooling units to the inlet of a second evaporative cooling unit of the plurality of evaporative cooling units, such that the first evaporative cooling unit and the second evaporative cooling unit are disposed in series relative to a flow of the liquid.

16. The air conditioning system of claim 14, comprising a plumbing assembly configured to:
   direct a first portion of the liquid from a first evaporative cooling unit of the plurality of evaporative cooling units to a manifold; and
   direct a second portion of the liquid from a second evaporative cooling unit of the plurality of evaporative cooling units to the manifold, such that the first evaporative cooling unit and the second evaporative cooling unit are disposed in parallel relative to a flow of the liquid.

17. The air conditioning system of claim 11, comprising:
   a first evaporative cooling unit of the plurality of evaporative cooling units;
   a second evaporative cooling unit of the plurality of evaporative cooling units;
   a first valve associated with the first evaporative cooling unit;
   a second valve associated with the second evaporative cooling unit; and
   a controller configured to:
      actuate the first valve to a first position to enable a first flow of liquid to the first evaporative cooling unit;
      actuate the first valve to a second position to block the first flow of liquid to the first evaporative cooling unit;
      actuate the second valve to a third position to enable a second flow of liquid to the second evaporative cooling unit; and
      actuate the second valve to a fourth position to block the second flow of liquid to the second evaporative cooling unit.

18. The air conditioning system of claim 11, comprising an air handling unit (AHU) including a fan configured to generate the air flow through the evaporative cooling units, and a housing configured to receive the plurality of evaporative cooling units.

19. The air conditioning system of claim 11, wherein each evaporative cooling unit of the plurality of evaporative cooling units comprises:
   a housing; and
   a flow blocker formed by or within the housing, wherein the flow blocker is configured to be actuated between:
      a first position in which the flow blocker directs the air flow through the winding; and
      a second position in which the flow blocker enables the air flow or a portion thereof to bypass the winding.

20. The air conditioning system of claim 11, wherein the plurality of evaporative cooling units comprises:
   a first evaporative cooling unit having a first frame in which a first winding of first microporous hollow fibers is disposed; and
   a second evaporative cooling unit having a second frame in which a second winding of second microporous hollow fibers is disposed.

* * * * *